United States Patent [19]
Bannai et al.

[11] Patent Number: 5,502,495
[45] Date of Patent: Mar. 26, 1996

[54] IMAGE PROCESSING CAPABLE OF PROVIDING HIGHER RESOLUTION IN LOW-DENSITY REGIONS

[75] Inventors: Yuichi Bannai, Koganei; Toshihiko Sato, Inagi; Kunihiro Yamamoto, Machida, all of Japan

[73] Assignee: Canon Kabushiki Kaisha, Tokyo, Japan

[21] Appl. No.: 272,506

[22] Filed: Jul. 7, 1994

Related U.S. Application Data

[63] Continuation of Ser. No. 821,775, Jan. 16, 1992, abandoned.

[30] Foreign Application Priority Data

Jan. 25, 1991 [JP] Japan ................................ 3-007814
Jan. 25, 1991 [JP] Japan ................................ 3-007815

[51] Int. Cl.$^6$ .......................... H04N 1/405; H04N 1/409; G06T 5/00
[52] U.S. Cl. .......................... 358/447; 358/458; 358/465; 382/252; 382/254
[58] Field of Search .......................... 358/443, 447, 358/448, 454, 455, 456, 458, 465, 466, 298, 532, 534; 382/252, 254, 266, 270

[56] References Cited

U.S. PATENT DOCUMENTS

| | | | |
|---|---|---|---|
| 4,771,471 | 9/1988 | Kitamura | 382/41 |
| 4,827,352 | 5/1989 | Yoneda et al. | 358/298 |
| 4,873,577 | 10/1989 | Chamzas | 358/447 |
| 4,876,610 | 10/1989 | Ohsawa et al. | 358/443 |
| 4,878,125 | 10/1989 | Katayama et al. | 358/443 |
| 4,958,236 | 9/1990 | Nagashima et al. | 358/445 |
| 4,958,238 | 9/1990 | Katayama et al. | 358/454 |
| 4,975,786 | 12/1990 | Katayama et al. | 358/459 |
| 5,008,950 | 4/1991 | Katayama et al. | 358/447 |

FOREIGN PATENT DOCUMENTS

| | | |
|---|---|---|
| 238034 | 9/1987 | European Pat. Off. . |
| 2-100463 | 4/1990 | Japan . |
| 2-172169 | 9/1986 | United Kingdom . |

OTHER PUBLICATIONS

Robert Floyd and Louis Steinberg, "An Adaptive Algorithm For Spatial Grey Scale," *SID Int'l Symposium Digest of Technical Papers*, 1975, pp. 36–37.

Primary Examiner—Scott A. Rogers
Attorney, Agent, or Firm—Fitzpatrick, Cella, Harper & Scinto

[57] ABSTRACT

This disclosure relates to an image processing method and apparatus for applying binarizing processing to multivalue image data so as to produce binary image data, reproducing an image having shades of light and dark based upon the binary image data, and outputting the image. On the basis of the value of the inputted multivalue image data, a search is performed to determine whether there is a pixel whose value is "1" at the periphery of each pixel of the binarized image data with regard to the image where the value of the image data is small, i.e., a highlighted portion of the image. A pixel defining an isolated point is detected through this search. Next, with regard to a pixel defining an isolated point of the binarized image, if a pixel whose value is "1" exists comparatively near this pixel, the value of this pixel of interest is diffused near the pixel. If a pixel whose value is "1" exists comparatively far from this pixel, the value of this pixel of interest is diffused far from the pixel. Such diffusion relating to the value of an isolated point is executed upon referring to the relationship of a conversion that has been stored in a look-up table (LUT) memory that takes the resolution of the finally outputted image having shades of light and dark into consideration. By virtue of this processing, graininess is reduced with regard to low-density areas (highlighted portions), to which the human eye is most sensitive, in a reproduced image based upon a pseudo-half-tone processing method. A reproduced image having a high resolution is obtained without increasing the size of a page memory for storing image data.

23 Claims, 37 Drawing Sheets

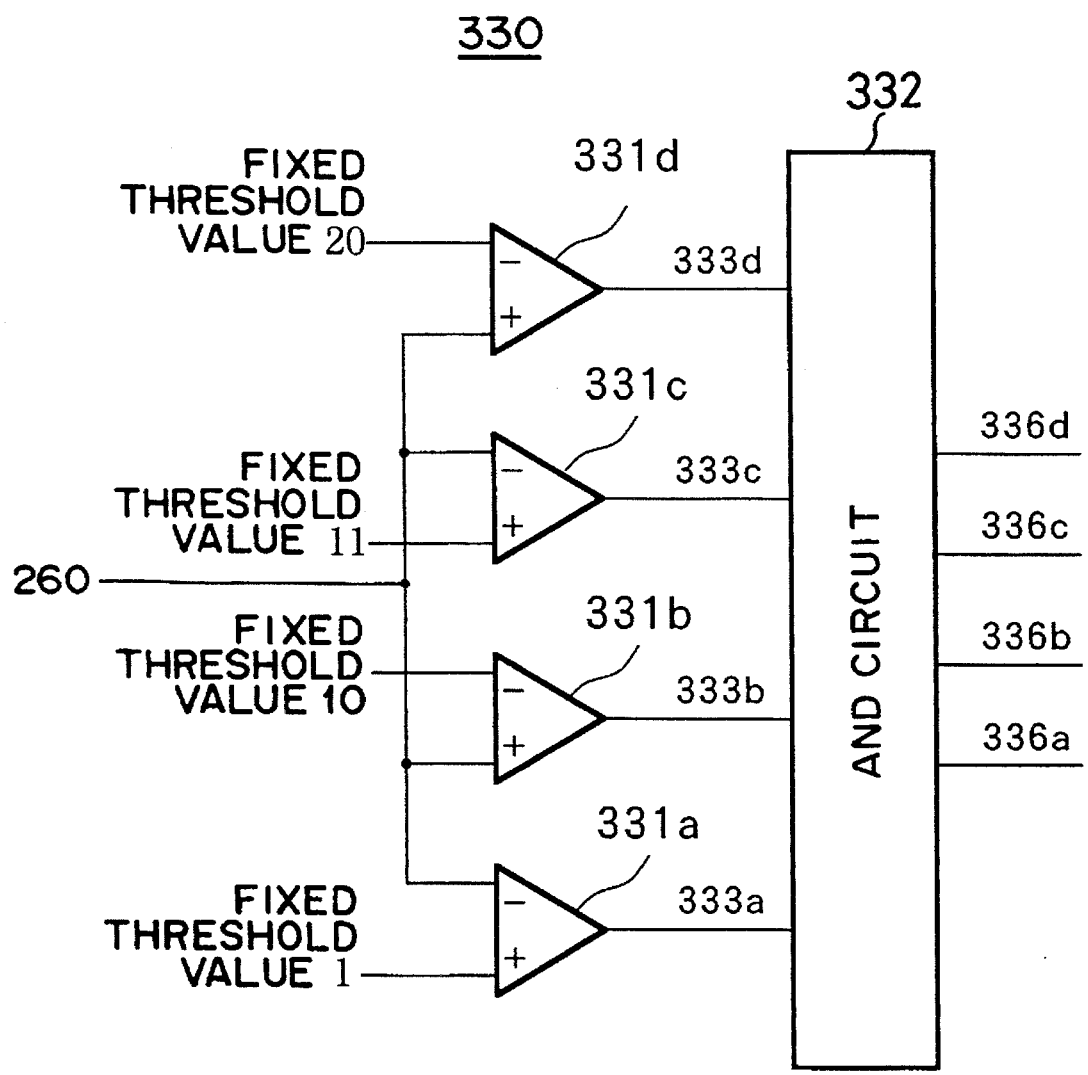

FIG. 6

| DENSITY (SIGNAL 260) | 333a | 333b | 333c | 333d | REMARKS | 336a | 336b | 336c | 336d |
|---|---|---|---|---|---|---|---|---|---|
| 1 | 1 | 0 | 1 | 0 | 0 | 1 | 0 | 0 | 0 |
| 1–10 | 0 | 0 | 1 | 0 | $1 \leq DENSITY \leq 10$ | 0 | 1 | 0 | 0 |
| 11–20 | 0 | 1 | 0 | 0 | $11 \leq DENSITY \leq 20$ | 0 | 0 | 1 | 0 |
| 20+ | 0 | 1 | 0 | 1 | $20 < DENSITY$ | 0 | 0 | 0 | 1 |

| 336a | 336b | 336c | 336d | | | 346 |
|---|---|---|---|---|---|---|
| 1 | 0 | 0 | 0 | 370a | 370b | |
| | | | | 0 | 0 | 1 |
| | | | | 0 | 1 | 1 |
| | | | | 1 | * | 1 |
| 0 | 1 | 0 | 0 | 370a | 370b | |
| | | | | 0 | 0 | 0 |
| | | | | 0 | 1 | 1 |
| | | | | 1 | * | 1 |
| 0 | 0 | 1 | 0 | 370a | 370b | |
| | | | | 0 | 0 | 0 |
| | | | | 0 | 1 | 0 |
| | | | | 1 | * | 1 |
| 0 | 0 | 0 | 1 | 370a | 370b | |
| | | | | 0 | 0 | 0 |
| | | | | 0 | 1 | 0 |
| | | | | 1 | * | 0 |

FIG. 8

| | | | | | | | |
|---|---|---|---|---|---|---|---|
| | $b_1'$ | $a_1'$ | $b_1$ | $b_2$ | $b_3$ | $b_4$ | $b_5$ | $b_6$ |
| | $b_2'$ | $a_2'$ | $b_7$ | $a_1$ | $a_2$ | $a_3$ | $a_4$ | $a_5$ |
| | $b_3'$ | $a_3'$ | $b_8$ | $a_6$ | $a_7$ | $a_8$ | $a_9$ | $a_{10}$ |
| | $b_4'$ | $b_5'$ | $b_9$ | $a_{11}$ | $a_{12}$ | $a_{13}$ | ✻ | |

FIG. 13

| | | | | | | | |
|---|---|---|---|---|---|---|---|
| $b_1'$ | $a_1'$ | $b_1$ | $b_2$ | $b_3$ | $b_4$ | $b_5$ | $b_6$ |
| $b_2'$ | $a_2'$ | $b_7$ | ✻$a_1$ | $a_2$ | $a_3$ | $a_4$ | $a_5$ |
| $b_3'$ | $a_3'$ | $b_8$ | $a_6$ | $a_7$ | $a_8$ | $a_9$ | $a_{10}$ |
| $b_4'$ | $b_5'$ | $b_9$ | $a_{11}$ | $a_{12}$ | $a_{13}$ | | |

FIG. 14

|  | ath COLUMN | | bth COLUMN | | cth COLUMN | | dth COLUMN | | eth COLUMN | |
|---|---|---|---|---|---|---|---|---|---|---|
|  |  |  |  |  |  |  |  |  |  |  |
|  |  |  | 1 |  |  |  | 1 |  |  |  |
|  |  |  |  |  | ✶ |  |  |  |  |  |
|  |  |  |  |  |  |  |  |  |  |  |
|  |  |  | 1 |  |  |  | 1 |  |  |  |
|  |  |  |  |  |  |  |  |  |  |  |

FIG. 17

| | | ath COLUMN | | bth COLUMN | | cth COLUMN | | dth COLUMN | | eth COLUMN | |
|---|---|---|---|---|---|---|---|---|---|---|---|
| LSB | 2 |  |  |  |  |  |  |  |  |  |  |
| 3 | 4 |  |  | 1 |  |  |  |  |  | 1 |  |
| 5 | 6 |  |  |  |  | ✶ |  |  |  |  |  |
| 7 | 8 |  |  |  |  |  |  |  |  |  |  |
| 9 | 10 |  |  |  |  |  |  |  |  |  |  |
| 11 | MSB |  |  | 1 |  |  |  |  |  | 1 |  |

FIG. 18

| 460a | 460b | 460c | e 516e | | d 516d | | c 516c | | b 516b | | a 516a | |
|---|---|---|---|---|---|---|---|---|---|---|---|---|
| | | | LSB | MSB | LSB | MSB | LSB | MSB | LSB | MSB | LSB | MSB |
| 0 | 0 | 0 | 00000000000 | 00000000000 | 00000000000 | 00000000000 | 00000000000 | 00000000000 | 00000000000 | 00000000000 | 00000000000 | 00000000000 |
| 0 | 0 | 1 | 00000000000 | 00000000000 | 00000000000 | 00000000000 | 00000000000 | 00000000000 | 00000000000 | 00000000000 | 00000000000 | 00000000000 |
| 0 | 1 | 1 | 00000000000 | 00000000000 | 00000000000 | 00000000000 | 00000000000 | 00000000000 | 00000000000 | 00000000000 | 00000000000 | 00000000000 |
| 1 | 0 | 0 | 00000000000 | 00000000000 | 00010000000 | 00000000001 | 00000000000 | 00000000000 | 00000000000 | 00000000000 | 00010000000 | 00000000001 |
| 1 | 0 | 1 | 00000000000 | 00000000000 | 00100000100 | 00000010000 | 00000000000 | 00000000000 | 00100000000 | 00000001000 | 00000000000 | 00000000000 |
| 1 | 1 | 1 | 00000000000 | 00000000000 | 00000000000 | 00000000000 | 00001111000 | 00000000000 | 00000000000 | 00000000000 | 00000000000 | 00000000000 |

| 460a | 460b | 460c | 516e (5th COLUMN) LSB — MLSB | 516d (4th COLUMN) MLSB — MSB | 516c (3rd COLUMN) MLSB — MSB |
|---|---|---|---|---|---|
| 0 | 0 | 0 | 00000000000000000000000000000000 | 00000000000000000000000000000000 | 00000000000000000000000000000000 |
| 0 | 0 | 1 | 00000000000000000000000000000000 | 00000000000000000000000000000000 | 00000000000000000000000000000000 |
| 0 | 1 | 1 | 00000000000000000000000000000000 | 00000000000000000000000000000001 | 00000000000000000000000000000001 |
| 1 | 0 | 0 | 00000000000000000000000000000000 | 00000010000000000000100000000000 | 00000010000000000010010000000000 |
| 1 | 0 | 1 | 00000000000000000000000000000000 | 00000010000000000100100000000000 | 00001001000000000111110000000000 |
| 1 | 1 | 1 | 00000000000000000000000000000000 | 00000000000000000000000000000000 | 00000000000000000000000000000000 |

| 460a | 460b | 460c | 516b (2nd COLUMN) LSB — MLSB | 516a (1st COLUMN) MLSB — MSB |
|---|---|---|---|---|
| 0 | 0 | 0 | 00000000000000000000000000000000 | 00000000000000000000000000000000 |
| 0 | 0 | 1 | 00000000000000000000000000000000 | 00000000000000000000000000000000 |
| 0 | 1 | 1 | 00000000000000000000000000000000 | 00000000000000000000000000000001 |
| 1 | 0 | 0 | 00001000000000000000000000000000 | 00000000000000000000000000000000 |
| 1 | 0 | 1 | 00001000000000000001000000000000 | 00000000000000000000000000000000 |
| 1 | 1 | 1 | 00000000000000000000000000000000 | 00000000000000000000000000000000 |

| 460a | 460b | 460c | LUT (LSB → MSB) |
|------|------|------|-----------------|
| 0 | 0 | 0 | 0 0 0 0 0 0 0 0 0 0 0 0 |
| 0 | 0 | 1 | 0 0 0 0 0 0 0 0 0 0 0 0 |
| 0 | 1 | 1 | 0 0 0 0 0 0 0 0 0 0 0 0 |
| 1 | 0 | 0 | 0 0 0 1 0 0 0 0 0 1 0 0 |
| 1 | 0 | 1 | 0 0 0 0 1 0 0 0 1 0 0 0 |
| 1 | 1 | 1 | 0 0 0 0 0 0 1 1 0 0 0 0 |

FIG. 30

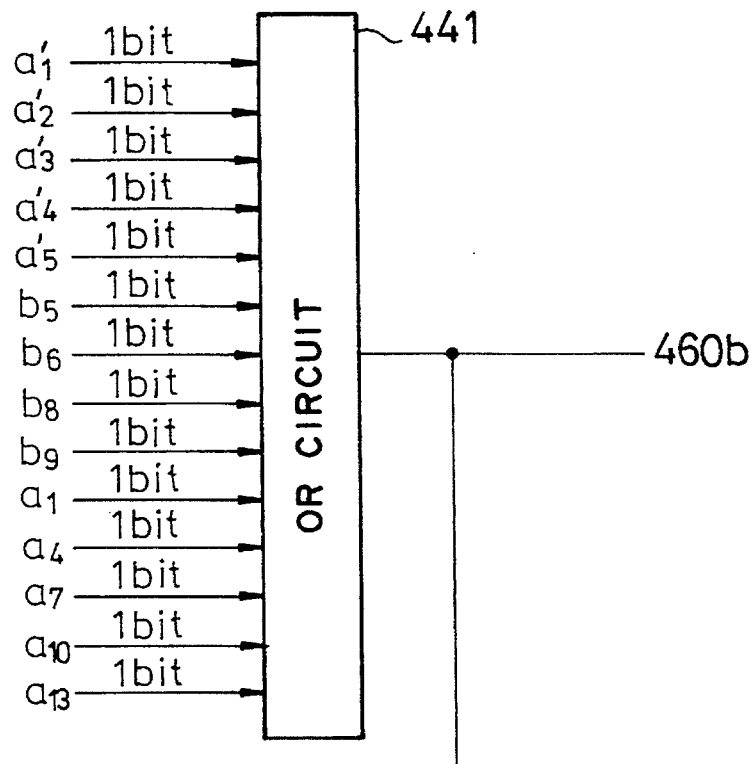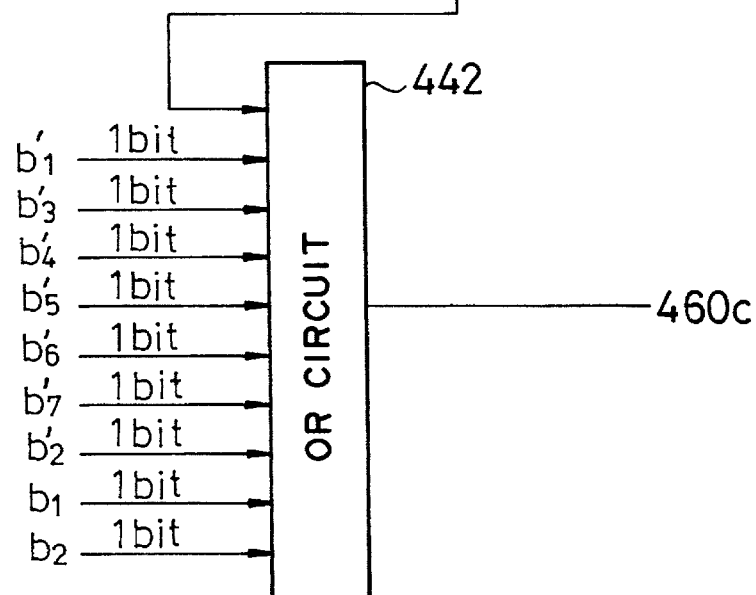
FIG. 33

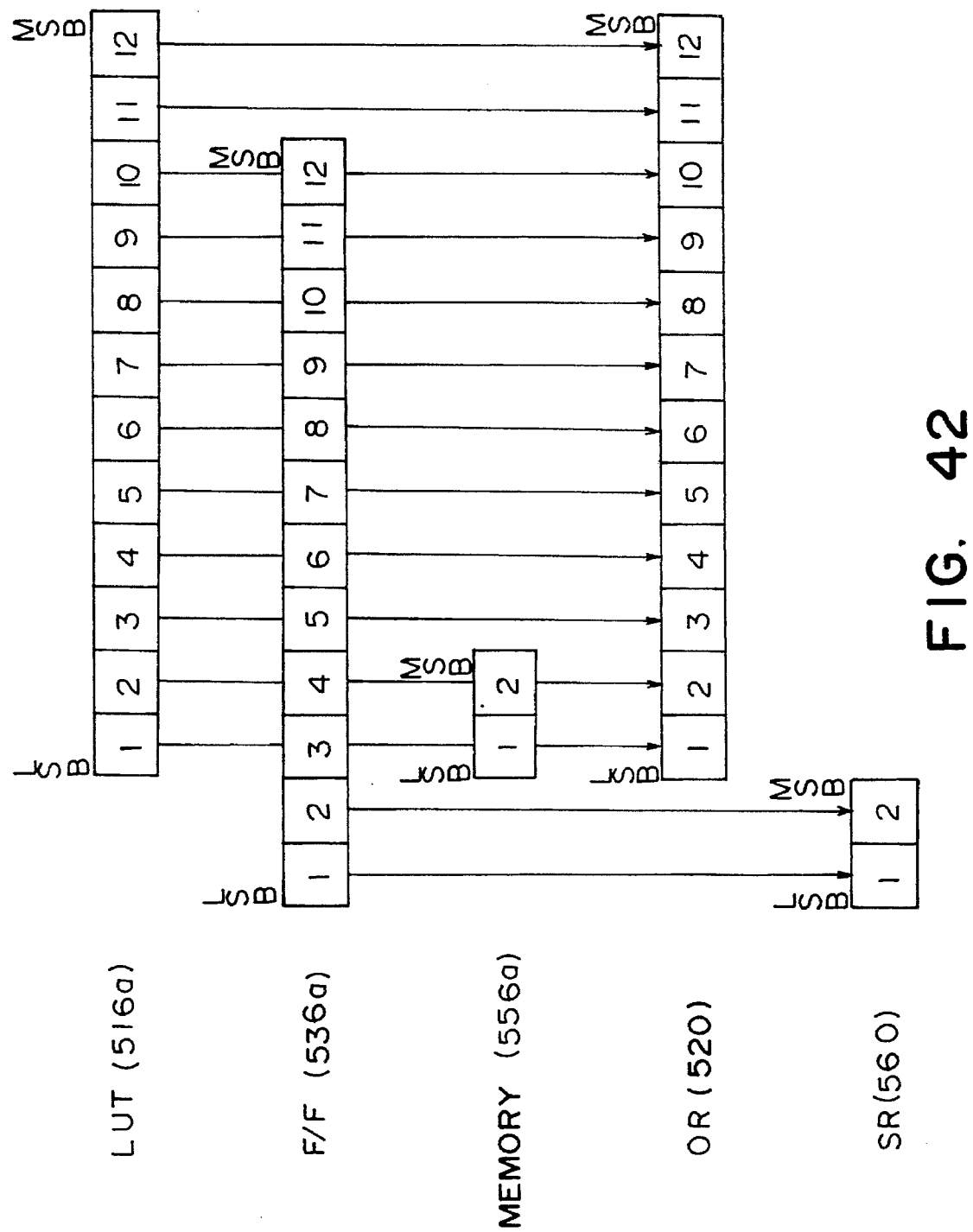

IMAGE PROCESSING CAPABLE OF PROVIDING HIGHER RESOLUTION IN LOW-DENSITY REGIONS

This application is a continuation of application Ser. No. 07/821,775, filed Jan. 16, 1992, now abandoned.

BACKGROUND OF THE INVENTION

1. Field of the Invention

This invention relates to an image processing method and apparatus and, more particularly, to an image processing method and apparatus through which the resolution of binary image data can be improved. By way of example, the invention relates to an image processing apparatus applied to image processing in an image output unit such as a digital printer or digital facsimile machine.

2. Description of the Prior Art

An image output unit such as a digital printer or digital facsimile machine most generally is a binary output (i.e., a "black" or "white" output) device for reasons of economy and safety. In a binary output unit of this kind, pseudo-half-tone processing, described below, is necessary in order to output a gray-level image.

The most typical technique employed in the art is the dither method. In accordance with the dither method, an m×n (where m, n are natural numbers) dither matrix is prepared, a binary measurement is performed by comparing inputted multivalue data with the threshold values of corresponding matrix elements, and an m×n binarized block is formed, whereby a half-tone image is reproduced in pseudo-fashion.

With the dither method, however, the number of gray levels that can be expressed is limited to (m×n+1). This is undesirable in terms of resolution.

By contrast, an error diffusion method, which was proposed in 1975 by Floyd and Steinberg in the technical paper "An Adaptive Algorithm for Special Grayscale", which appeared in the 1975 SID International Symposium Digest of Technical Papers, surpasses the dither method in terms of both resolution and gray level. This technique has recently become the focus of much attention.

In the error diffusion method, binarization is performed at a fixed threshold value, a corrective density is obtained by adding, to the density of a pixel of interest, a diffusion error from a pixel in back of the pixel of interest (i.e., from a pixel processed before the pixel of interest), the difference is calculated between this corrective density and a binarized density (e.g., "white"=0, "black"=255 when density is expressed using eight bits) resulting from the aforementioned binarization, and this difference is caused to diffuse as a new error to a pixel in front of the pixel of interest (i.e., to a pixel which has not yet been processed).

However, in a reproduced image obtained by pseudo-half-tone processing such as the above-described error diffusion method, the graininess of low-density areas (highlighted portions), to which the human eye is most sensitive, becomes unsightly, and this is a factor that impedes further improvement in picture quality.

Though graininess diminishes when the resolution of the output device is improved, the improvement in resolution is accompanied by the need for an increase in the size the page memory of a page printer or the like having such a memory, which is for storing one page. The result is higher cost.

By way of example, if resolution in the main scanning direction is doubled, twice the amount of page memory will be required. If resolution is doubled in both the main and subordinate scanning directions, four times the amount of page memory will be required.

SUMMARY OF THE INVENTION

Accordingly, an object of the present invention is to provide an image processing method capable of preventing low-density areas (highlighted portions), to which the human eye is most sensitive, from developing graininess in an image reproduced based upon a pseudo-half-tone processing method, whereby a reproduced image of high picture quality and little sense of graininess can be obtained without increasing the size of a page memory.

According to the present invention, the foregoing object is attained by providing an image processing method for applying binarizing processing to multivalue image data so as to produce binary image data, reproducing an image having shades of light and dark based upon the binary image data, and outputting the image, comprising the steps of: an input step of inputting the multivalue image data, a binarizing step of binarizing the multivalue image data, a detecting step of detecting a pixel, which is an isolated point, in the image data binarized at the binarizing step, a converting step of dividing information indicative of the pixel of the isolated point, which pixel has been detected at the detecting step, into a plurality of pixels and outputting this information, and an output step of outputting a light-and-dark image based upon an output obtained at the converting step.

In accordance with the present invention as described above, it is possible to obtain a binary image having a high picture quality and little sense of graininess.

Another object of the present invention is to provide an image processing apparatus capable of obtaining a reproduced image of high picture quality in which the graininess of low-density areas (highlighted portions) is reduced without increasing the size of a page memory.

According to the present invention, the foregoing object is attained by providing an image processing apparatus for applying binarizing processing to multivalue image data so as to produce binary image data, reproducing an image having shades of light and dark based upon the binary image data, and outputting the image, comprising: input means for inputting the multivalue image data, binarizing means for binarizing the multivalue image data, detecting means for detecting a pixel, which is an isolated point, in the image data binarized by the binarizing means, converting means for dividing information indicative of the pixel of the isolated point, which pixel has been detected by the detecting means, into a plurality of pixels and outputting this information, and output means for outputting a light-and-dark image based upon an output from the converting means.

In accordance with the present invention as described above, it is possible to obtain a reproduced image of high picture quality in which the graininess of low-density areas (highlighted portions) is reduced without increasing the size of a page memory.

The invention is particularly advantageous since the low-density areas of a binarized image are sensed, the dots present in the low-density areas are divided or split up into dots having a higher resolution, and these dots are outputted, whereby a reproduced image of high picture quality with little sense of graininess can be obtained without increasing the size of a page memory.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram showing diffusion coefficients for error diffusion in the error diffusion unit of FIG. 3;

FIG. 5 is a block diagram showing the detailed construction of a comparator depicted in FIG. 2;

FIG. 6 a diagram showing the input/output characteristic of the comparator shown in FIG. 2;

FIG. 8 is the truth table of the AND/OR circuit depicted in FIG. 2;

FIGS. 13 and 14 are diagrams showing examples of windows of the binary data monitoring unit shown in FIG. 1;

FIGS. 17 and 18 are diagrams showing pixel data diffused in accordance with a first embodiment;

FIG. 19 is a diagram showing the contents of a LUT shown depicted in FIG. 16;

FIGS. 24 and 25 are diagrams illustrating image data diffused in accordance with the second embodiment;

FIG. 26 is a diagram showing the contents of a LUT depicted in FIGS. 24 and 25;

FIG. 30 is a diagram showing the contents of a LUT depicted in FIG. 28;

FIG. 33 is a detailed circuit diagram of another OR circuit shown in FIG. 31;

FIGS. 34 and 35 are diagrams for describing windows of the binary data monitoring unit in accordance with the fourth embodiment;

FIG. 41 is a diagram showing the contents of a LUT depicted in FIG. 39; and

FIG. 42 is a diagram for describing the operation of the resolution converting circuit of FIG. 39.

DESCRIPTION OF THE PREFERRED EMBODIMENTS

The preferred embodiments of the present invention will now be described in detail in accordance with the accompanying drawings.

[Description of Common Embodiment (FIGS. 1–15)]

The construction of a binarizing apparatus shared by five embodiments set forth below will now be described. The binarizing apparatus is adapted to apply binarizing processing to multivalue image information that is capable of expressing the half-tones of one page of an output image, and to print out an image of light and dark shades capable of reproducing gray levels. When dot data is outputted in the print-out operation of this apparatus, the scanning direction of a printer head, laser beam or the like is made the main scanning direction, and the direction of printing paper transfer is made the subordinate direction.

In each of the five embodiments, only the components which characterize the particular embodiment in the binarizing apparatus will be described.

<General Description of Binarizing Apparatus (FIG. 1)>

Figure 1:
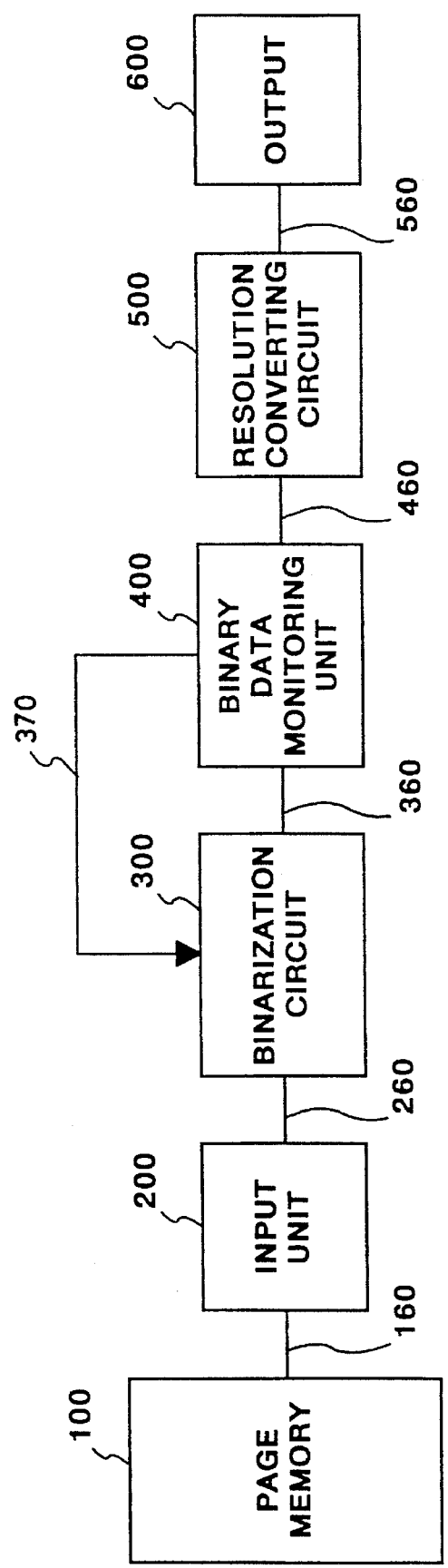
FIG. 1 is a block diagram illustrating the construction of a binarizing apparatus which is a typical embodiment of the present invention.

FIG. 1 is a block diagram illustrating the construction of a binarizing apparatus which is a typical embodiment of the present invention. In FIG. 1, numeral 100 denotes a page memory of a controller. The page memory 100 stores one page of image information of the output image. Digital data representing eight bits (256 tones) of density is sent to an input unit 200 over a data line 160. The input unit 200 temporarily stores the data sent from the page memory 100. Thereafter, in synchronization with a read clock, the data is read out of the input unit 200 successively and transferred to a processing section in order to be processed. Thus, even if data is transferred from the page memory 100 asynchronously with the processing section, the data can subsequently be outputted and processed in synchronization with the clock of the processing section.

Numeral 260 denotes a data line on which the multivalue data synchronized to the clock of the processing section is outputted. This data represents 8-bit density information in the same manner as the digital data transmitted through the data line 160. A binarizing circuit 300 performs binarizing processing based upon information from the data line 260 and a data line 370 and outputs binary data (i.e., "1" (black) or "0" (white)), which is the result of the processing, on a data line 360.

A binary data monitoring unit 400 refers to the signal (signal line 360) outputted by the binarizing circuit 300 and to a monitoring area (a window area) of binarized pixels on the periphery of a pixel of interest and determines whether the window area contains a dot which is black ("1"). The monitoring unit 400 outputs the result of this determination on the signal line 370, thereby feeding it back to the binarizing circuit 300. Meanwhile the binary data monitoring unit 400 refers to a second monitoring area (a window area different from that mentioned above) of binarized pixels on the periphery of the pixel of interest and determines whether the window area contains a dot which is black ("1"). The result of this determination is outputted on a signal line 460.

Based upon the data transmitted through the signal line 460, a resolution converting circuit 500 serially outputs, successively in the form of two bits, data obtained by referring to a table, prepared in advance, having four times the amount of data. This serial output is performed during one clock of a synchronizing clock signal of the preceding processing section, which includes the binarizing circuit 300. As a result, the resolution of the output data in the main scanning direction of an output unit 600 is doubled.

The output unit 600 performs the actual print-out of data arriving on signal line 560.

The detailed construction of each portion of the binarizing apparatus comprising the components set forth above will now be described.

<Description of Binarizing Circuit 300 (FIGS. 2–9)>

Figure 2:
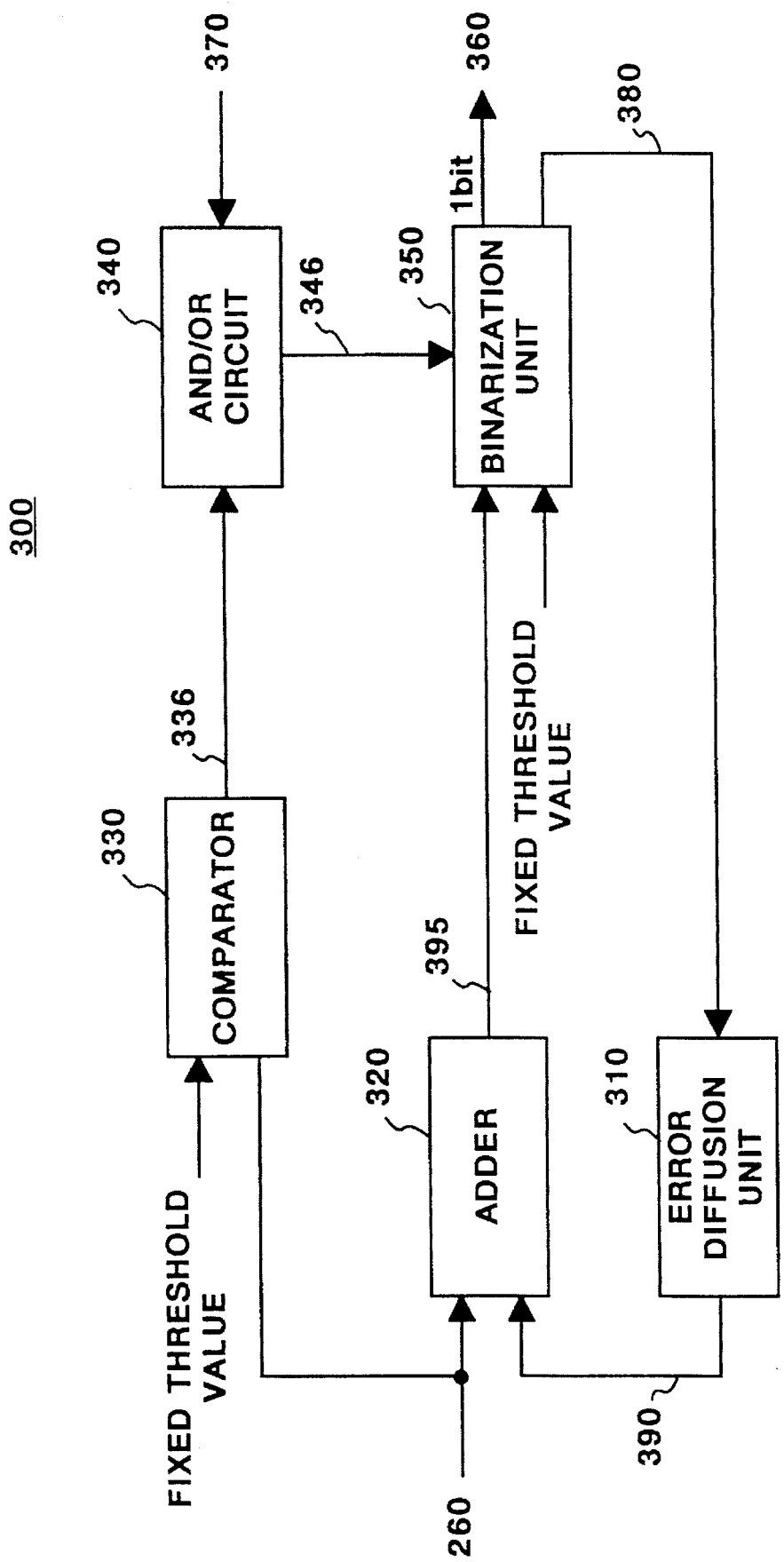
FIG. 2 is a block diagram showing the detailed construction of a binarizing circuit illustrated in FIG. 1.

FIG. 2 is a block diagram showing the detailed construction of the binarizing circuit 300 illustrated in FIG. 1. The binarizing circuit 300 includes an error diffusion unit 310, which applies allotting processing to error components generated by binarization. The density signal of the pixel of interest enters an adder 320 from the signal line 260. Meanwhile, the sum total of errors allotted to the position of the pixel of interest is outputted on a signal line 390 from the error diffusion unit 310, and this signal also enters the adder 260. The adder 320 delivers the sum of these two input signal to a signal line 395. A comparator 330 compares the density of the pixel of interest with a group of fixed threshold values, determines the range within which the density resides and outputs a signal indicative of the determination to a signal line 336. Depending upon the data outputted on signal line 336 from the comparator 330 and the data outputted on signal line 370 from the binary data monitoring unit 400, an AND/OR circuit 340 outputs a binarized "black" dot inhibit signal on a signal line 346.

A binarizing unit 350, which compares the density signal from the signal line 395 with a fixed threshold value, performs binarization upon taking the binarized dot inhibit signal from signal line 346 into consideration. A binarized signal from the binarizing unit 350 is outputted on a the signal line 360 as a single-bit ["1" (black) or "0" (white)] signal. Error components generated as a result of binarization are outputted on a signal line 380 and thus are fed back to the error diffusion unit 310.

Figure 3:
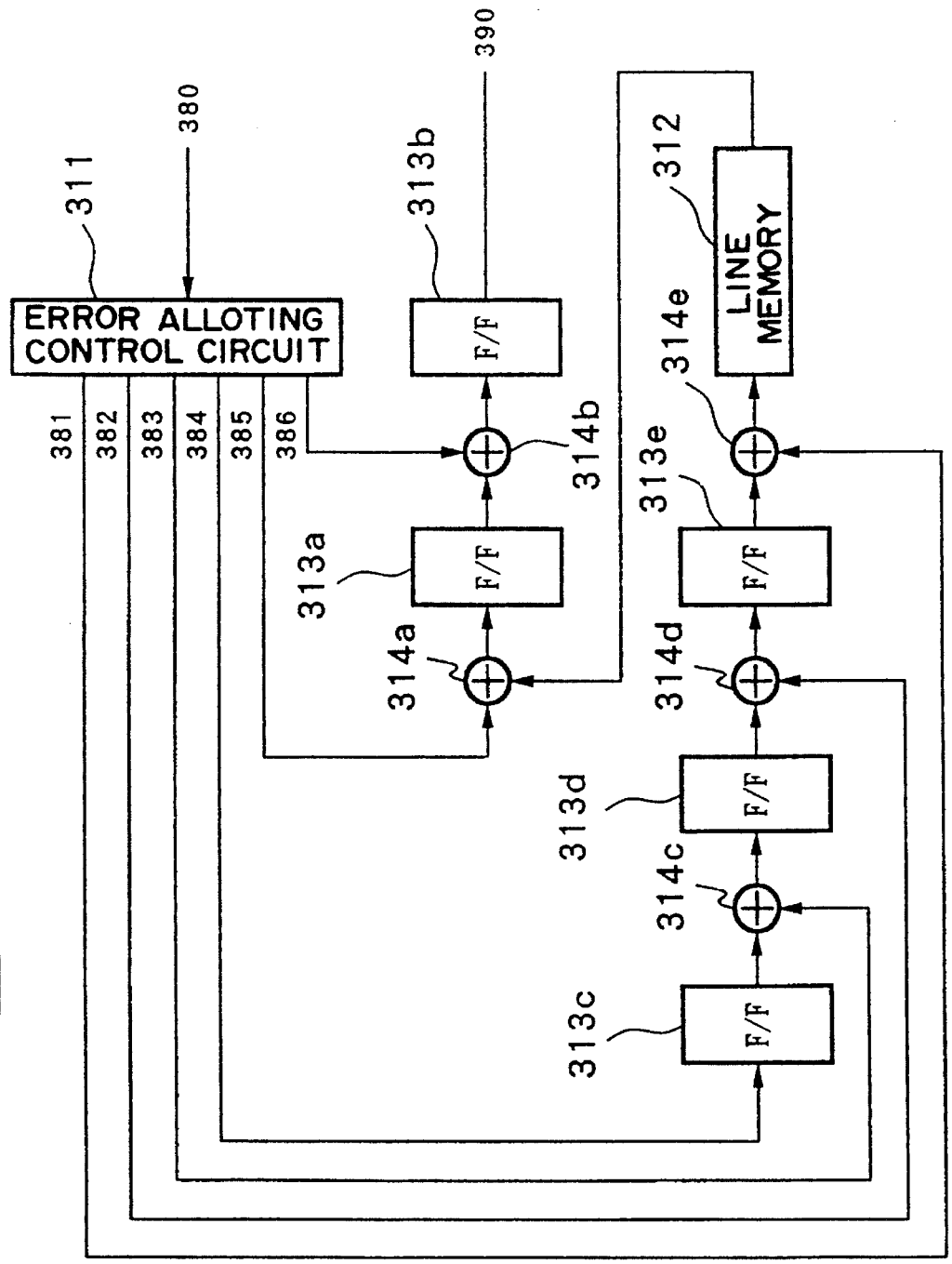
FIG. 3 is a circuit diagram showing the detailed construction of an error diffusion unit illustrated in FIG. 2.

FIG. 3 is a block diagram showing the detailed construction of the error diffusion unit 310 depicted in FIG. 2. Numeral 311 designates an error-allotment control circuit, 312 a line memory (FIFO memory) for applying a one-line delay, 313a–313e flip-flops for latching data, and adders 314a–314e.

In this arrangement, the error component from signal line 380 enters the error-allotment control circuit 311, which applies error components having the weighting coefficients shown in FIG. 4 to the adders. More specifically, a signal line 381 connects a quantity which is ⅛ of an error component to the adder 314e, a signal line 382 connects a quantity which is ⅛ of the error component to the adder 314d, a signal line 383 connects a quantity which is ⅖ of the error component to the adder 314c, a signal line 384 connects a quantity which is ⅛ of the error component to the flip-flop 313c, a signal line 385 connects a quantity which is ⅛ of the error component to the adder 314a, and a signal line 386 connects a quantity which is ⅖ of the error component to the adder 314b.

The line memory 312 outputs the sum total of the errors allotted to the pixel of interest in the processing up to the immediately preceding cycle. This signal enters the adder 314a. Addition is performed in successive fashion and the sum total of the errors that have accumulated at the "position" of the pixel of interest is inputted to the flip-flop 313b. The result is outputted on the signal line 390.

FIG. 5 is a block diagram showing the detailed construction of the comparator 330 illustrated in FIG. 2. As shown in FIG. 5, the comparator 330 includes level comparators 331a–331d and an AND circuit 332. The density value of the pixel of interest enters from the signal line 260 and is applied to the "−" terminals of comparators 331a and 331c and to the "+" terminals of comparators 331b and 331d. Fixed threshold values "1", "11 " enter the "+"terminals of comparators 331a and 331c, and fixed threshold values "10", "20" enter the "−" terminals of comparators 331b and 331d. Thus the density of the pixel of interest is compared with each of these threshold values.

Specifically, as shown in FIG. 6, if the density value of the pixel of interest is "0" then the comparators 331a, 331c output "1" and the comparators 331b, 331d output "0". If the density value of the pixel of interest is in the range "1"–"10", or "5" for example, only the comparator 331c outputs a "1"; the other comparators output "0". If the density value of the pixel of interest is in the range "11"–"20", or "15", for example, only the comparator 331b outputs a "1"; the other comparators output "0". Finally, if the density value of the pixel of interest is "21" or greater, the comparators 331b, 331d output "1" and the other comparators output "0".

The AND circuit 332 serves as a decoder of the density signal. For example, when the density is "0", the output on the signal line 336a is "1" and the output on each of the signal lines 336b–336d is "0". In the case of other density values, the signals indicated in the truth table of FIG. 6 are obtained.

Figure 7:
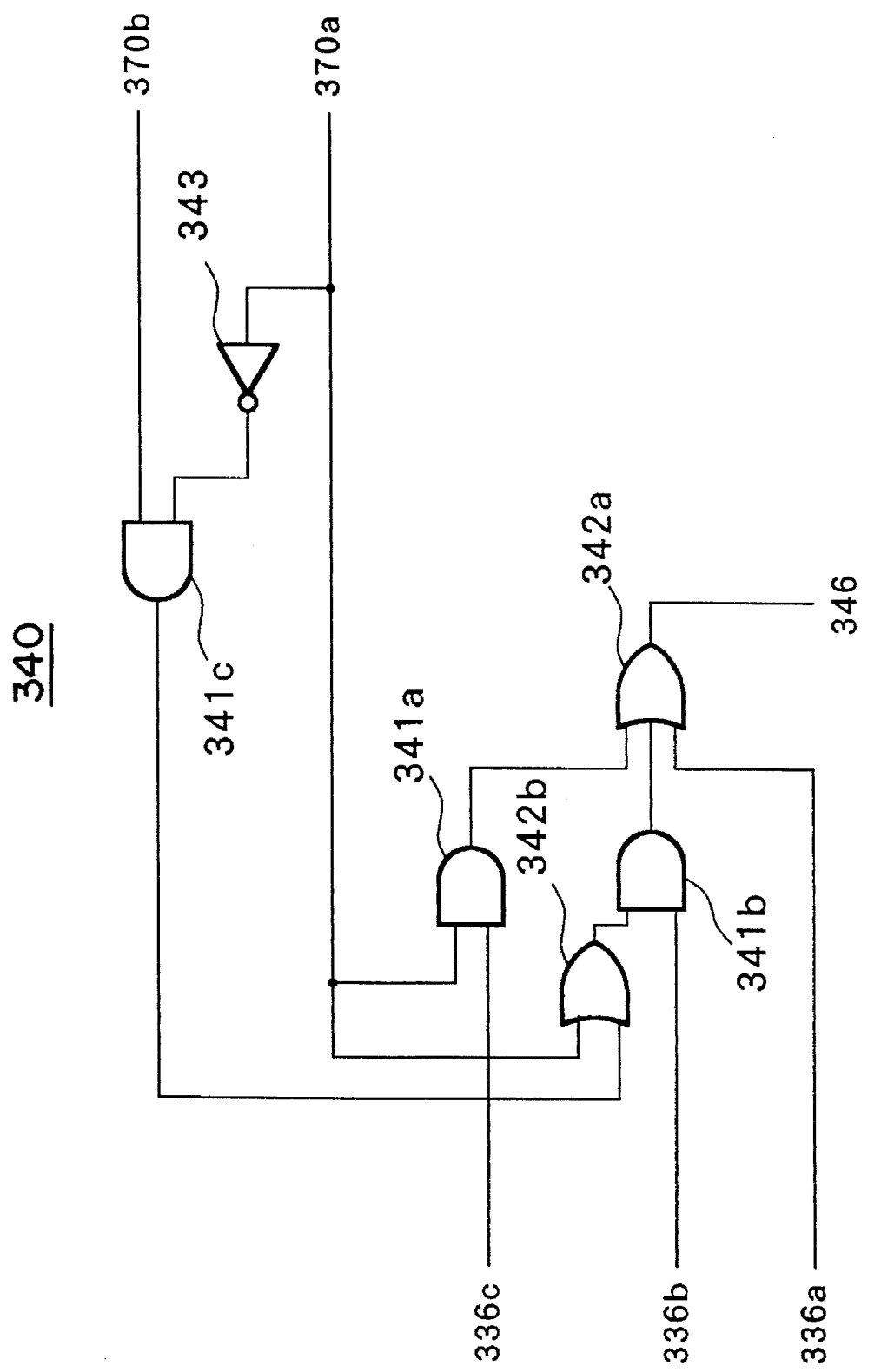
FIG. 7 is a diagram showing the detailed circuit construction of an AND/OR circuit depicted in FIG. 2.

FIG. 7 is a block diagram showing the detailed construction of the AND/OR circuit depicted in FIG. 2.

FIG. 8 is a truth table corresponding to the outputs on the signal lines of the AND/OR circuit depicted in FIG. 7. As shown in FIG. 7, the AND/OR CIRCUIT 340 includes AND gates 341a–341c, OR gates 342a, 342b, and an inverter 343. Signal lines 370a, 370b introduce the outputs from the binary data monitor unit 400, described below. The binary dot inhibit signal is generated from these output signals and output signals from the comparators 331a–331d.

In a case where the data on signal line 336a is "1" i.e., the density value of the pixel of interest is "0", the binarized dot is forcibly made "0" (white). Accordingly, "1" is outputted as the inhibit signal on signal line 346 via the OR gate 342a.

In a case where the density value of the pixel of interest has a level of "1"–"10" i.e., the data on signal line 336b is "1", the window area is monitored in large size. If a black dot ("1") already exists, the binarized black dot is forcibly inhibited. In other words, in a case where the data on signal line 370a is "1" the AND condition of AND gate 341b is satisfied and "1" is outputted on signal line 346, via the OR gate 342a, as the inhibit signal of the binarized dot. Further, if the data on signal line 370a is "0" and the data on signal line 370b is "1" then in this case also "1" is outputted via the AND gate 341c. Similarly, "1" is outputted by the AND gate 341b. Thus, "1" outputted as the inhibit signal of the binarized dot on signal line 346 via the OR gate 342a.

In a case where the density value of the pixel of interest has a level of "11"–"20" i.e., the data on signal line 336c is "1" the window area is monitored in a small size. If a black dot ("1") already exists, the binarized dot is forcibly inhibited. In other words, if the data on signal line 370a is "1" the AND condition of AND gate 341a is satisfied and the AND gate 341a outputs "1". This is outputted as the inhibit signal of the binarized black dot on signal line 346 via the OR gate 342a.

Figure 9:
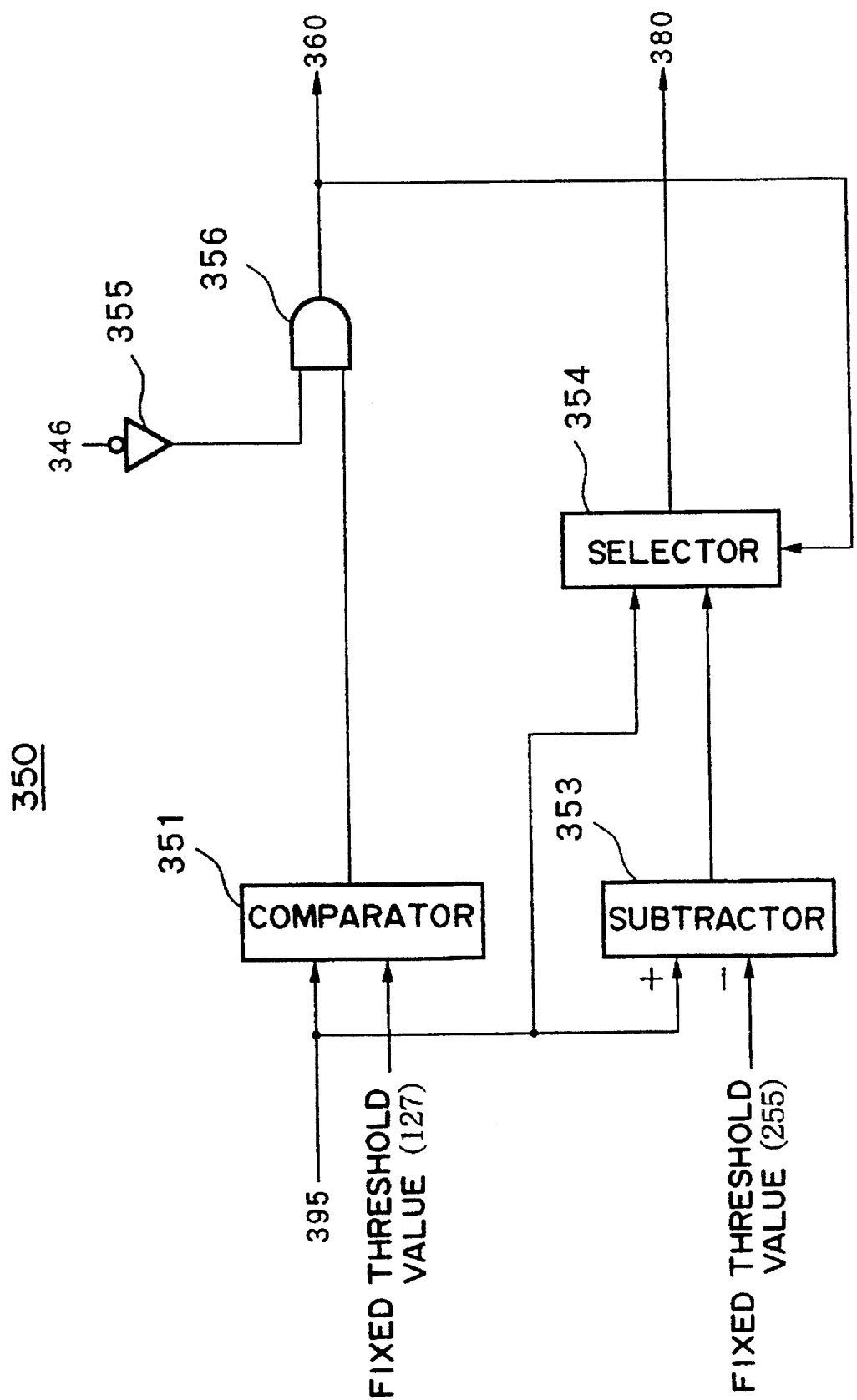
FIG. 9 is a block diagram showing the detailed construction of a binarizing unit illustrated in FIG. 2.

FIG. 9 is a block diagram showing the detailed construction of the binarizing unit 350 depicted in FIG. 2. As shown in FIG. 9, the binarizing unit 350 includes a comparator 351, a subtractor 353, a selector 354, an inverter 355 and an AND gate 356.

The sum of the density value of the pixel of interest and the sum total of the error signals allotted to the position of the pixel of interest enters the comparator 351 from signal line 395. Meanwhile, a fixed threshold value ("127") also enters the comparator 351, which proceeds to compare the fixed threshold value with the above-mentioned sum of the density value and the sum total of the distributed errors [i.e., (density value of pixel of interest)+(sum total of distributed errors)]. The comparator 351 outputs the result of this comparison to the AND gate 356.

More specifically, if the (density value of pixel of interest)+(sum total of distributed errors) is greater than the threshold value, "1" (black) is outputted; if it is smaller, "0" (white) is outputted. This output is applied to one input terminal of the AND gate 356. If the data on signal line 346 from the AND/OR circuit 340 is "1" i.e., if binarization is inhibited, then "0" is inputted to the AND gate 356 via the inverter 355. As a consequence, the AND condition of AND gate 356 is not satisfied and "0" is outputted to the signal line 360. On the other hand, if the (density value of pixel of interest)+(sum total of distributed errors) is greater than the threshold value and the data on signal line 346 is "0", i.e., if binarization is not inhibited, "1" is outputted on signal line 360. Further, the subtractor 353 outputs the result of subtracting "255" from the data on signal line 395 and applies this result to the selector 354. The data on signal line 395 is inputted to the other input terminal of the selector 354.

If "1" is outputted on signal line 360 as the result of binarization, the output value of subtractor 353 applied to the selector 354 is selected and this value is outputted on signal line 380. If "0" is outputted on line 360, the data on signal line 395 is selected by the selector 354 and this is outputted on signal line 380.

<Description of Binary Data Monitoring unit 400 (FIGS. 10–15)>

Figure 10:
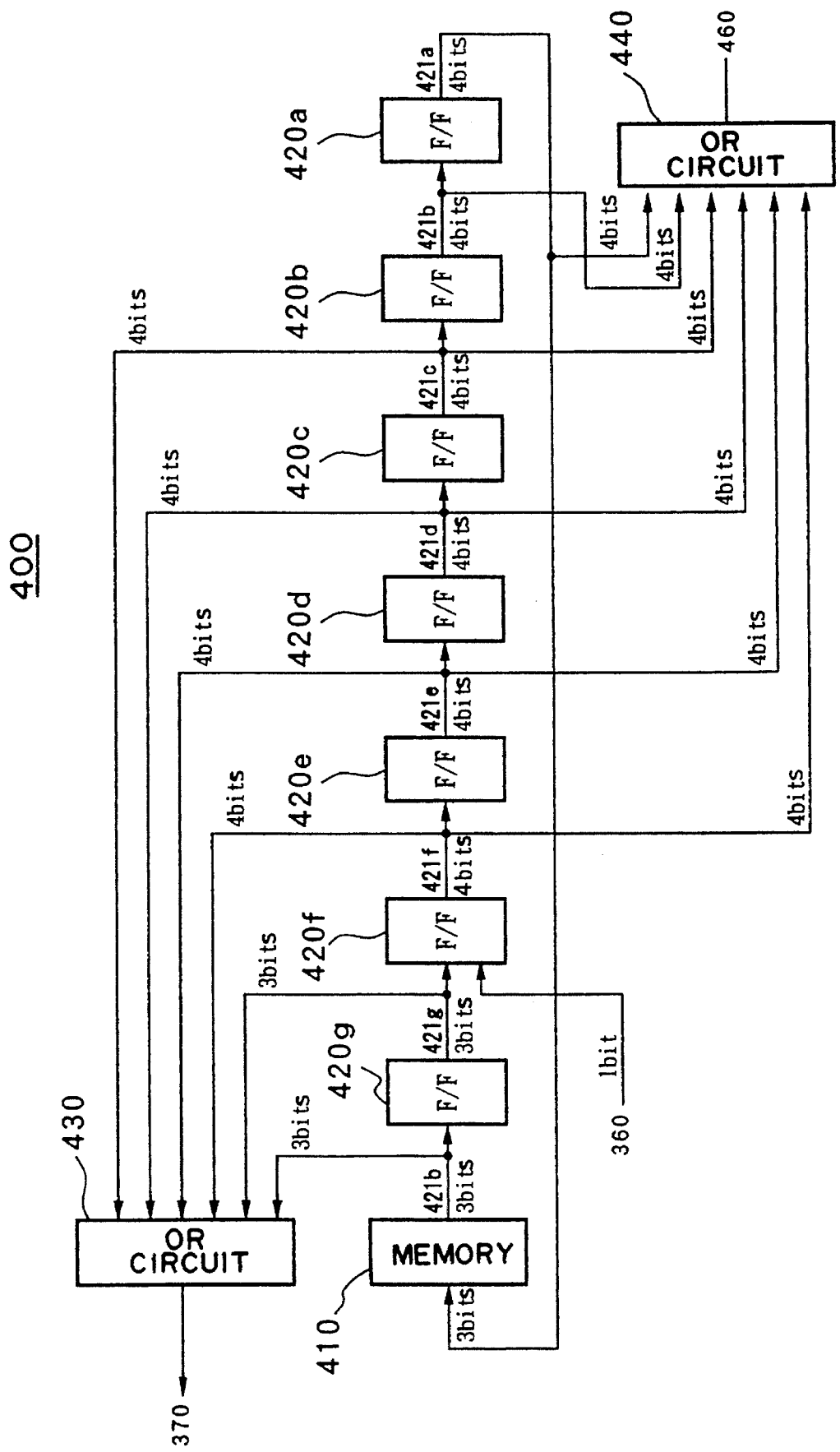
FIG. 10 is a block diagram showing the detailed construction of a binary data monitoring unit 400 shown in FIG. 1.

FIG. 10 is a block diagram illustrating the detailed construction of the binary data monitoring unit 400 shown in FIG. 1. As shown in FIG. 10, the monitoring unit 400 includes a FIFO memory 410 which has 3-bit input and output and is capable of storing three lines of binary results, flip-flops 420a–420g for latching data, and OR circuit units 430, 440. Binarized data from the memory 410 is successively inputted to the flop-flop 420g in synchronization with the clock signal. Thereafter, the data is shifted to the flip-flops 420f–420a successively every clock pulse.

Meanwhile, "1" or "0" from signal line 360 is inputted to the MSB side of the flip-flop 420f as the results processed by the binarizing circuit 300. Accordingly, the output of the flip-flops 420f–420a is four bits.

The binarized results ($b_1'$, $b_2'$, $b_3'$, $b_4'$) shown in FIGS. 13, 14 are latched, in order from the least significant, in the flip-flop 420a.

Similarly, the four bits ($a_1'$, $a_2'$, $a_3'$, $b_5'$) shown in FIG. 13 are latched in the flip-flop 420b, the four bits ($b_1$, $b_7$, $b_8$, $b_9$) in the flip-flop 420c, the four bits ($b_2$, $a_1$, $a_6$, $a_{11}$) in the flip-flop 420d, the four bits ($b_3$, $a_2$, $a_7$, $a_{12}$) in the flip-flop 420e, the four bits ($b_4$, $a_3$, $a_8$, $a_{13}$) in the flip-flop 420f, and the three bits ($b_5$, $a_4$, $a_9$) in the flip-flop 420g. The three bits ($b_6$, $a_5$, $a_{10}$) are outputted by the memory 410.

The four bits from each of the flip-flops 420c–420f, the three bits from the flip-flops 420g, and the three bits from the memory 410 enter the OR circuit unit 430. The four bits from each of the flip-flops 420a–420f enter the OR circuit unit 440.

Figure 11:
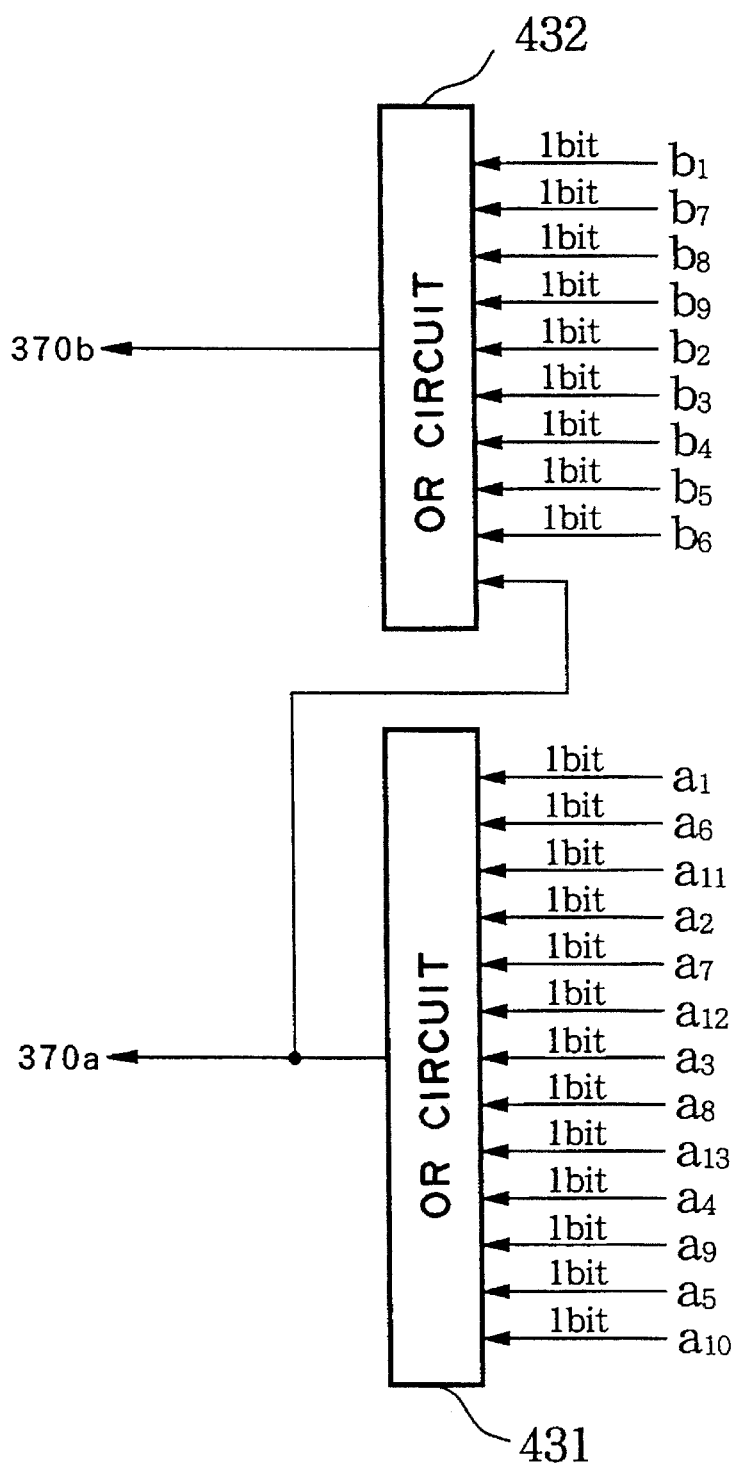
FIG. 11 is a detailed circuit diagram of an OR circuit shown in FIG. 10.

FIG. 11 is a block diagram showing the detailed construction of the OR circuit unit 430 depicted in FIG. 10. In FIG. 11, numerals 431 and 432 denote OR circuits.

The inputs to the OR circuit 431 are the three bits ($a_1$, $a_6$, $a_{11}$) of the signal 421d from the flip-flop 420d, the three bits ($a_2$, $a_7$, $a_{12}$) of the signal 421e from the flip-flop 420e, the three bits ($a_3$, $a_8$, $a_{13}$) of the signal 421f from the flip-flop 420f, the two bits ($a_4$, $a_9$) of the signal 421g from the flip-flop 420g, and the two bits ($a_5$, $a_{10}$) of the signal 421h from the memory 410. The OR circuit 431 detects whether even one of these inputs is "1" (a black dot).

The inputs to the OR circuit 432 are the four bits ($b_1$, $b_7$, $b_8$, $b_9$) of the signal 421c from the flip-flop 420c, the bit ($b_2$) of the signal 421d from the flip-flop 420d, the bit ($b_3$) of the signal 421e from the flip-flop 420e, the two bit ($b_4$) of the signal 421f from the flip-flop 420f, the bit ($b_5$) of the signal 421g from the flip-flop 420g, the bit ($b_6$) of the signal 421h from the memory 410, and the output signal 370a of OR circuit 421. The OR circuit 432 detects whether even one of these inputs is "1" (a black dot).

Thus, the OR circuit portion 430 detects whether there is a "1" (a black dot) in two window areas of different sizes, and the result is outputted on signal lines 370a and 370b.

Figure 12:
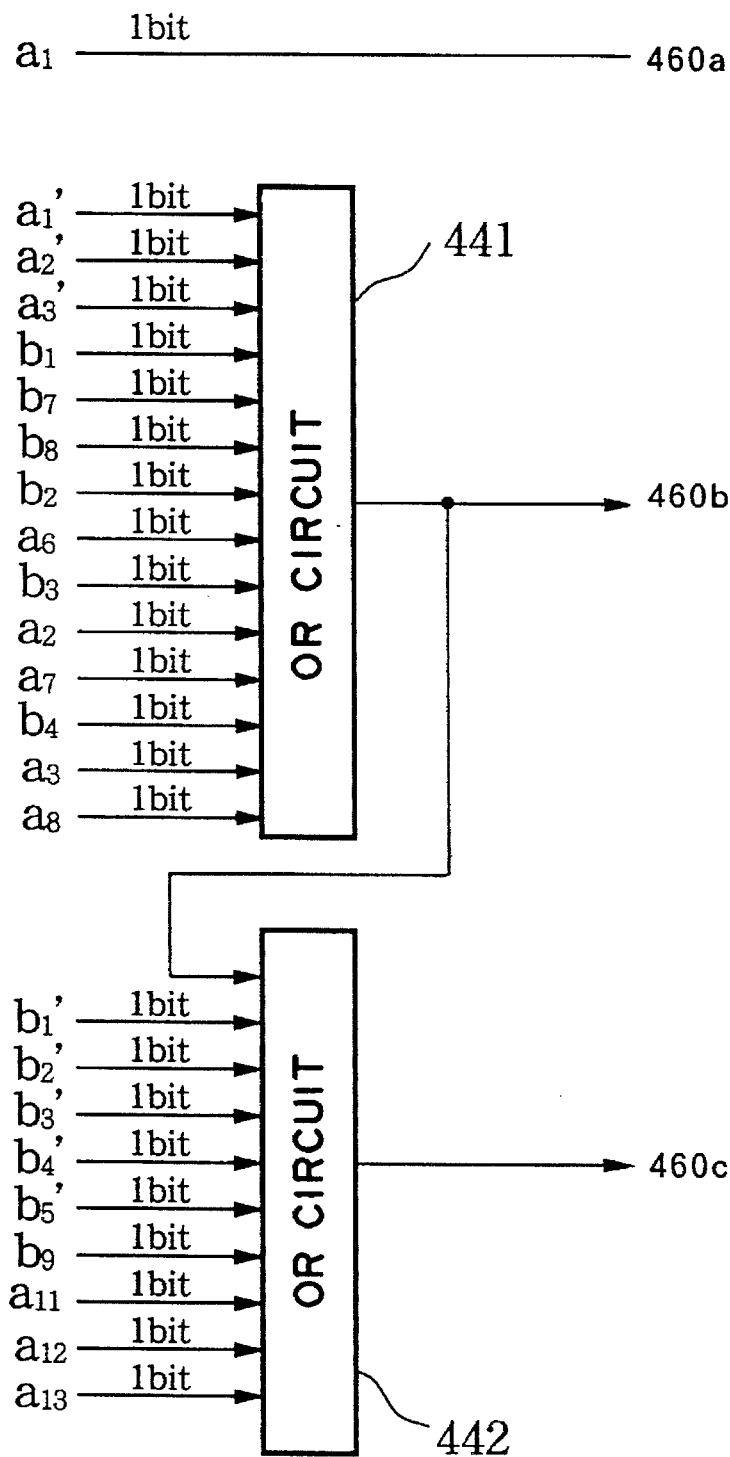
FIG. 12 is a detailed circuit diagram of another OR circuit shown in FIG. 10.

FIG. 12 is a block diagram showing the detailed construction of the OR circuit unit 440 depicted in FIG. 10. In FIG. 12, numerals 441 and 442 denote OR circuits. The character al shown in FIG. 12 is one bit of the signal on signal line 421d from the flip-flop 420d and is outputted on signal line 460a. This is also the binarized result of the pixel of interest in the binary data monitoring window for conversion of resolution.

The inputs to the OR circuit 441 are the three bits ($a_1'$, $a_2'$, $a_3'$) of the signal 421b from the flip-flop 420b, the three bits ($b_1$, $b_7$, $b_8$) of the signal 421c from the flip-flop 420c, the two bits ($b_2$, $a_6$) of the signal 421d from the flip-flop 420d, the three bits ($b_3$, $a_2$, $a_7$) of the signal 421e from the flip-flop 420e, and the three bits ($b_4$, $a_3$, $a_8$) of the signal 421f from the flip-flop 420f. The OR circuit 441 detects whether even one of these inputs is "1" (a black dot).

The inputs to the OR circuit 442 are the four bits ($b_1'$, $b_2'$, $b_3'$, $b_4'$) of the signal 421a from the flip-flop 420a, the bit ($b_5'$) of the signal 421b from the flip-flop 420b, the bit ($b_9$) of the signal 421c from the flip-flop 420c, the bit ($a_{11}$) of the signal 421d from the flip-flop 420d, the bit ($a_{12}$) of the signal 421e from the flip-flop 420e, the bit ($a_{13}$) of the signal 421f from the flip-flop 420f, and the output signal 460b from the OR circuit 441. The OR circuit 442 detects whether even one of these inputs is "1" (a black dot).

Thus, the OR circuit portion 440 detects whether there is a "1" (a black dot) in two window areas of different sizes, and the result is outputted on signal lines 460a–460c.

Figure 15:
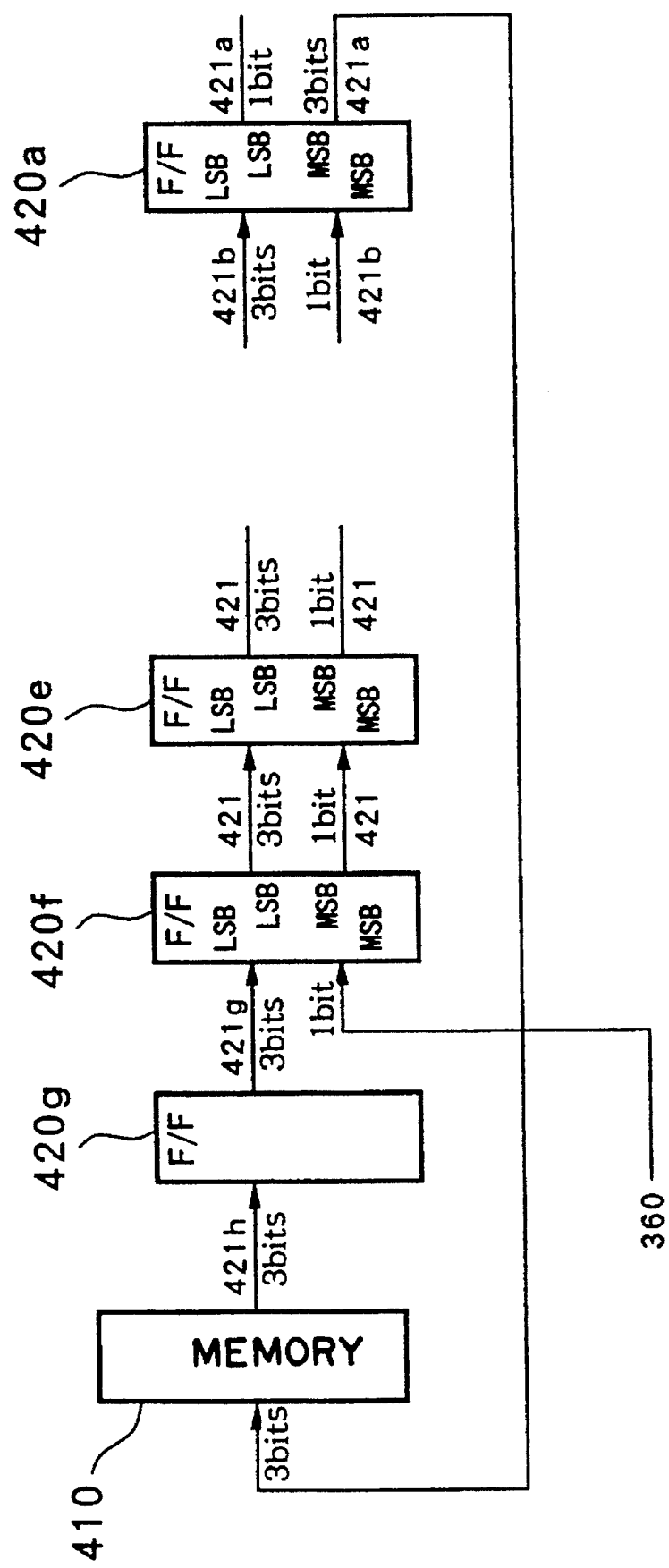
FIG. 15 is a connection diagram showing the connections between a memory and flip-flops illustrated in FIG. 10.

FIG. 15 is a diagram for describing the details of the memory 410 and flip-flops 420a–420g shown in FIG. 10.

When the series of processing operations such as binarization and error diffusion ends in the above-described arrangement, the pixel of interest is shifted by one pixel to update the data in the window, and the foregoing processing is then repeated. At the end of processing, the three higher order bits ($b_2'$, $b_3'$, $b_4'$) of the data in flip-flop 420a are fed back to and stored in the three-line buffer 410 in order to be used in the next line of processing. Accordingly, the three higher order bits ($b_2'$, $b_3'$, $b_4'$) of the data on line 421a from flip-flop 420a are stored in the memory 410. At the same time, the data on signal line 360, which data is the result of binarization, is inputted to the MSB side of the flip-flop 420f, where the data is latched.

Thus, the data in the flip-flops is shifted successively in synchronization with the clock, and the data which has finished undergoing processing is stored in the three-line memory.

First through fifth embodiments of the present invention will now be described. These five embodiments relate to a binarizing apparatus having the construction shown in FIG. 1. Though portions common to these five embodiments are as already described, each is characterized by the construction and operation of the resolution analyzing circuit 500. In the description of each embodiment, therefore, the discussion will center on the construction and operation of the resolution analyzing circuit 500.

[First Embodiment (FIGS. 16–22)]

In this embodiment, a case will be described wherein a binarized image is subjected to a two-fold resolution conversion in both the main and subordinate scanning directions, dots are split up and the result is outputted.

Figure 16:
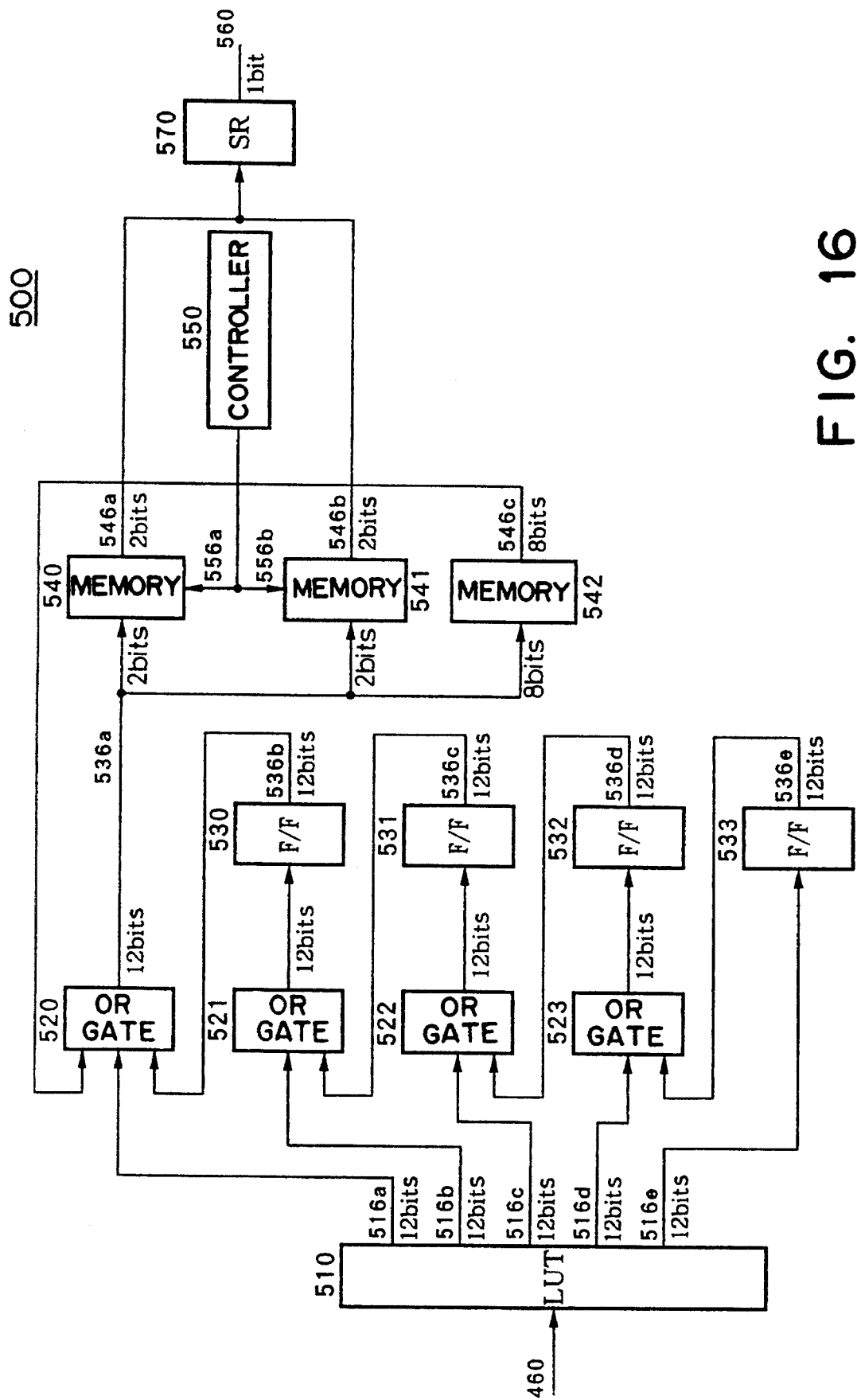
FIG. 16 is a block diagram showing the detailed construction of a resolution converting circuit depicted in FIG. 2.

FIG. 16 is a block diagram showing the detailed construction of the resolution converting circuit 500 depicted in FIG. 1. As shown in FIG. 16, the resolution converting circuit 500 includes a look-up table (hereinafter referred to as a "LUT") 510, OR gates 520–523, flip-flops 530–533 for latching data, FIFO memories 540, 541, 542 for storing two lines of binary results and having 2-bit, 2-bit and 8 -bit input/outputs, respectively, a controller 550 for controlling memory access, and a shift register 570 for converting parallel data into serial data.

FIG. 17 is a diagram showing a black dot (*), which is located in a small window area, split or subdivided into small dots of higher resolution. FIG. 18 is a diagram showing a black dot (*), which is located in a large window area, split or sub-divided into small dots of higher resolution. As will be understood from FIGS. 17 and 18, dots are dispersed nearby in the small window area and more distantly in the large window area.

FIG. 19 is a diagram showing in detail the contents of the LUT 510 depicted in FIG. 16. Patterns of $a^{th}$, $b^{th}$, $c^{th}$, $d^{th}$ and $e^{th}$ columns are generated on signal lines 516a, 516b, 516c, 516d, 516e, respectively, from the LUT 510.

In a case where data on signal line 460a from the binary data monitoring unit 400 is "0", i.e., when the pixel of interest is white, in FIG. 16, "0" is outputted as two dots in the main and subordinate scanning directions regardless of the data on the signal lines 460b and 460c from other window areas. Accordingly, as shown in FIG. 19, the signal line 516a of the $a^{th}$ column, the signal line 516b of the $b^{th}$ column, the signal line 516c of the $c^{th}$ column (which is that of the pixel of interest), the signal line 516d of the $d^{th}$ column and the signal line 516e of the $e^{th}$ column of LUT 510 together output "0" for all 12 bits from the LSB to the MSB. These outputs enter the OR gates 520–523 and the flip-flop 533, respectively, in FIG. 16.

In a case where the data on signal line 460a from the binary data monitoring unit 400 is "1", i.e., when the pixel of interest is a black dot, and there was no "1" (black dot) in the large window area, i.e., when the outputs on the Signal lines 460b and 460c are both "0", the "1"s (black dots) are dispersed far from the pixel of interest (the pixel marked by "*" in FIG. 18), as illustrated in FIG. 18. Accordingly, as depicted in FIG. 19, the LUT 510 produces the following outputs in the bit-order mentioned starting from the LSB: "000100000001", as the data of the $a^{th}$ column, from signal line 516a; "000000000000", as the data of the $b^{th}$ column, from signal line 516b; "000000000000", as the data of the $c^{th}$ column, from signal line 516c; "000100000001", as the data of the $d^{th}$ column, from signal line 516d; and "000000000000", as the data of the $e^{th}$ column, from signal line 516e. These outputs enter the OR gates 520–522 and flip-flop 533, respectively.

In a case where the signal on signal line 460a from the binary data monitoring unit 400 is "1", i.e., the pixel of interest is a black dot, there was no "1" in the small window area but only in the window area outside this area, i.e., if the outputs on signal lines 460b and 460c are "0" and "1", respectively, the "1"s (black dots) are dispersed near the pixel of interest (the pixel marked by "*" in FIG. 17), as illustrated in FIG. 17. Accordingly, as depicted in FIG. 19, the LUT 510 produces the following outputs in the bit order mentioned starting from the LSB: "000000000000", as the data of the $a^{th}$ column, from signal line 516a; "001000001000", as the data of the $b^{th}$ column, from signal line 516b; "000000000000", as the data of the $c^{th}$ column, from signal line 516c; "001000001000", as the data of the $d^{th}$ column, from signal line 516d; and "000000000000", as the data of the $e^{th}$ column, from signal line 516e. These outputs enter the OR gates 520–522 and flip-flop 533, respectively.

In a case where the signal on signal line 460a from the binary data monitoring unit 400 is "1", i.e., the pixel of interest is a black dot, and there was a "1" also in the small window area, i.e., if the outputs on signal lines 460b and 460c are both "1", a "1" (black dot) is simply added in both the main and subordinate scanning directions alongside the pixel of interest. Accordingly, as shown in FIG. 19, the LUT 510 outputs, in the bit order mentioned starting from the LSB, "000000000000" as the data of the $a^{th}$ and $b^{th}$ columns from the signal lines 516a and 516b. As the data of the $c^{th}$ column, "000011110000" is outputted from the signal line 516c in the order mentioned starting from the LSB. As the data of the $d^{th}$ and $e^{th}$ columns, "000000000000" is outputted, in the order mentioned starting from the MSB, from both the signal lines 516d and 516e. The data thus outputted enters the OR gates 520–523 and the flip-flop 533, respectively.

The processing of the $a^{th}$ column implemented by the OR gate 520 and memories 540–542 will now be described. Here the content of the LUT 510 shown in FIG. 19 corresponds to the bits shown in FIG. 18.

The inputs to the OR gate 520 are the 12 bits data outputted from the LUT 510 on signal line 516a, the 12 bits data from output signal line 536b of the flip-flop 530, which has stored the processed results up to the immediately preceding cycle, and 8 bit data from signal line 546c of the memory 542, which has stored the results of processing from the second line onward.

Figure 20:
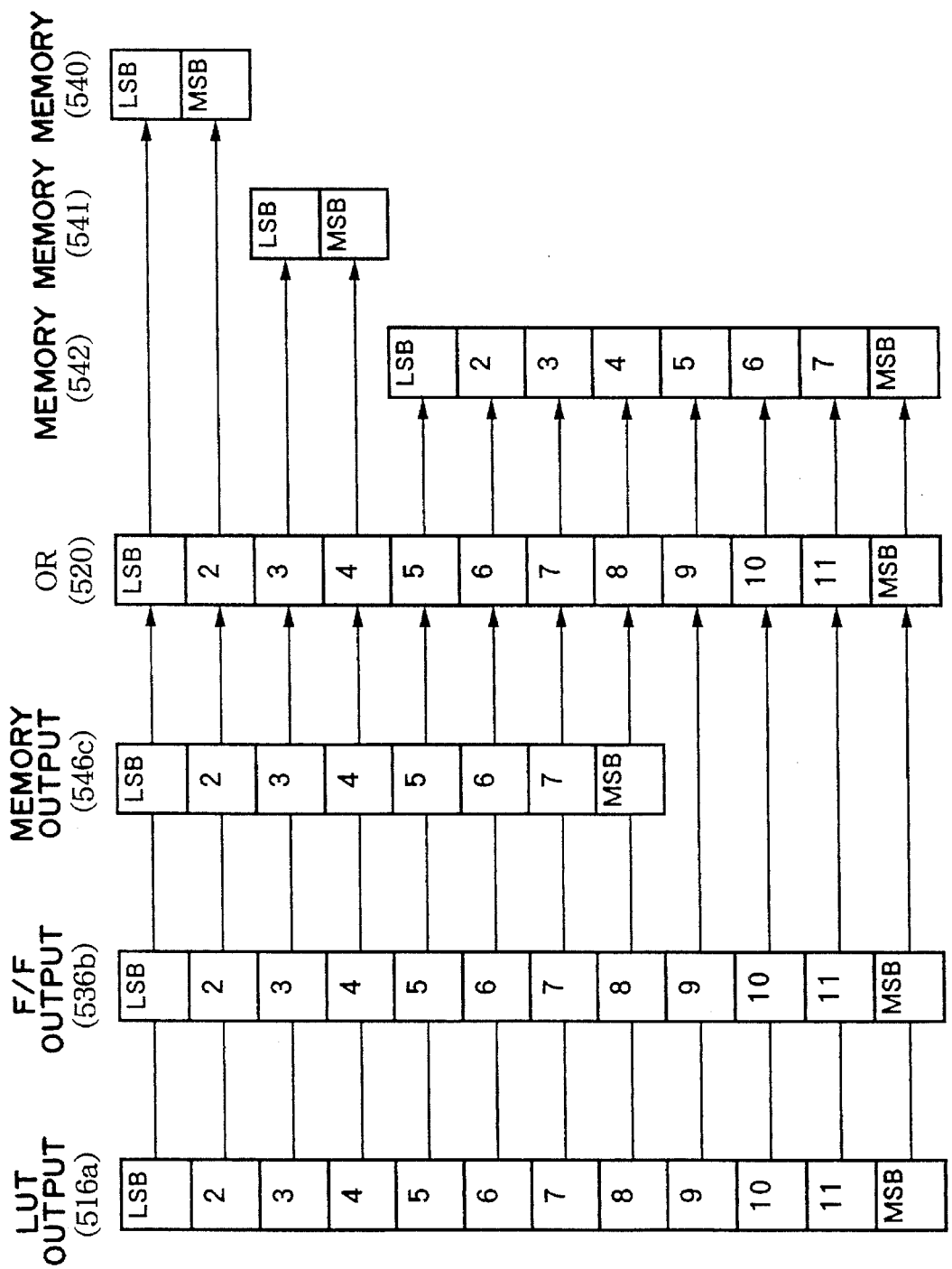
FIG. 20 is a diagram showing the operation performed by an OR circuit illustrated in FIG. 16.

More specifically, as shown in FIG. 20, the LSB of the data outputted on signal line 516a, the LSB of the data outputted on signal line 536b, and the LSB of the data outputted on signal line 546c enter the LSB side of the OR gate 520, the data is outputted as the processing on the LSB side, and this output enters the LSB of the memory 540, where it is stored. The second bit of output data on signal line 516a, the second bit of output data on signal line 536b, and the second bit of output data on signal line 546c enter the second bit of the OR gate 521, the data is outputted as the second bit of processing, and this output enters the MSB of the memory 540, where it is stored.

Further, the third and fourth bits of the output data on signal line 516a, the the third and fourth bits of the output data on signal line 536b, and the third and fourth bits of data on the signal line 546c enter the third and fourth bits of the OR gate 520, the data is outputted as the third and fourth bits of processing, and these outputs enter the LSB and MSB of the memory 541, where they are stored.

In addition, the fifth through eighth bits of the output data on signal line 516a, the fifth through eighth bits of the output data on on signal line 536b, and the fifth bit through the MSB of the output data on signal line 546c enter the fifth through eighth bits of the OR gate 520, the data is outputted as the fifth through eighth bits of processing, and these outputs enter the LSB through the fourth bit of the memory 542, where they are stored.

The ninth bit through MSB of the output data on signal line 516a, and the ninth bit through MSB of the output data on signal line 536b enter the ninth bit through the MSB of the OR gate 520, the data is outputted as the ninth bit through MSB of processing, and these outputs enter the fifth bit through MSB of the memory 542, where they are stored.

The processing of the $b^{th}$ column implemented by the OR gate 521 and flip-flop 530 will now be described.

The inputs to the OR gate 521 are the 12 bits data outputted from the LUT 510 on signal line 516b, and the 12 bits data from output signal line 536c of the flip-flop 531, which has stored processed results up to the immediately preceding cycle. The data is processed in correspondence with the LSB to the MSB, and the output is inputted to the flip-flop 530 in correspondence with the LSB to the MSB, where the data is stored.

The processing of the $c^{th}$ and $d^{th}$ columns is executed in the same manner as set forth above. The data outputted on signal line 516e from the LUT 510 is directly inputted to the flip-flop 533, where it is stored as the $e^{th}$ column of processing.

Figure 21:
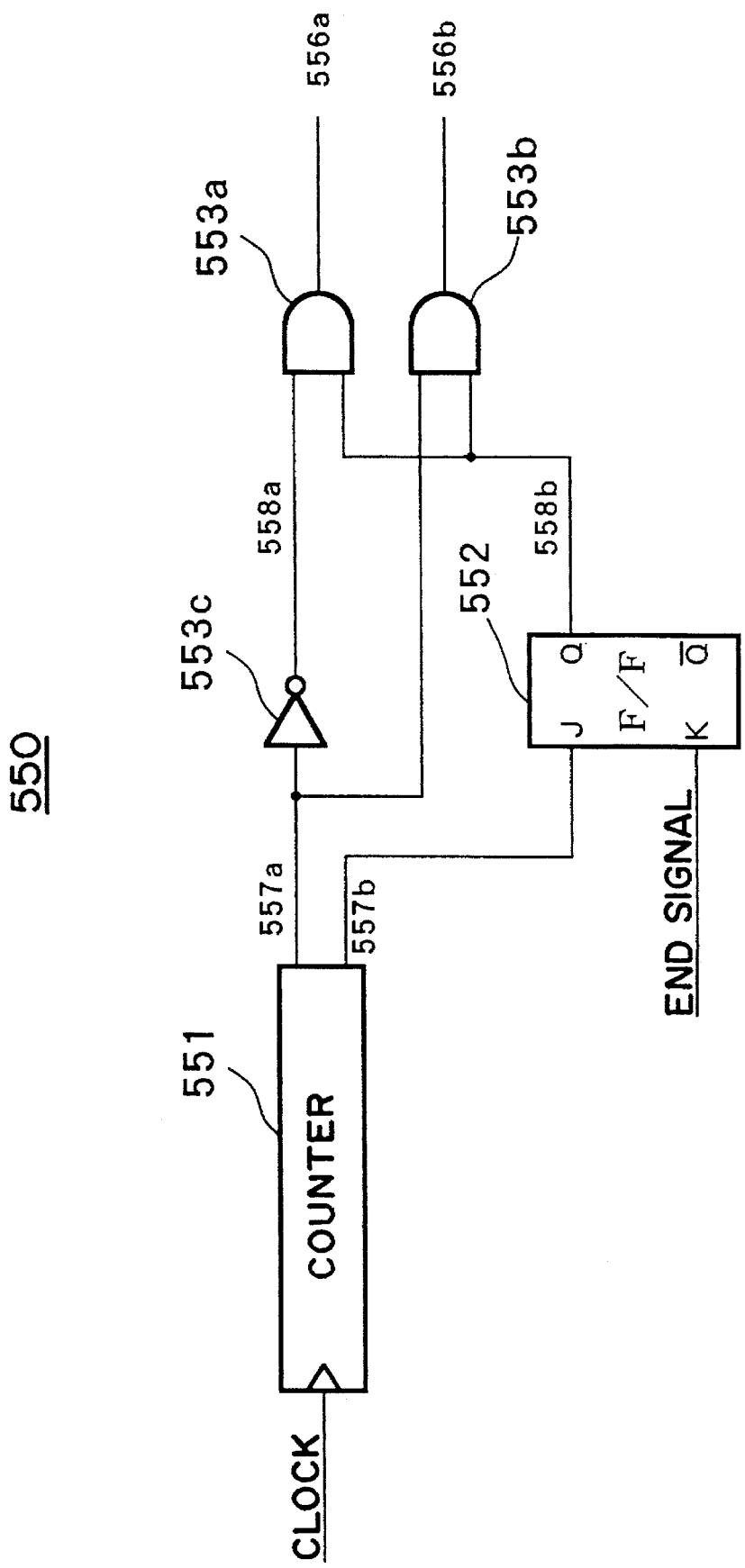
FIG. 21 is a diagram showing the circuit construction of a controller in FIG. 16.
Figure 22:
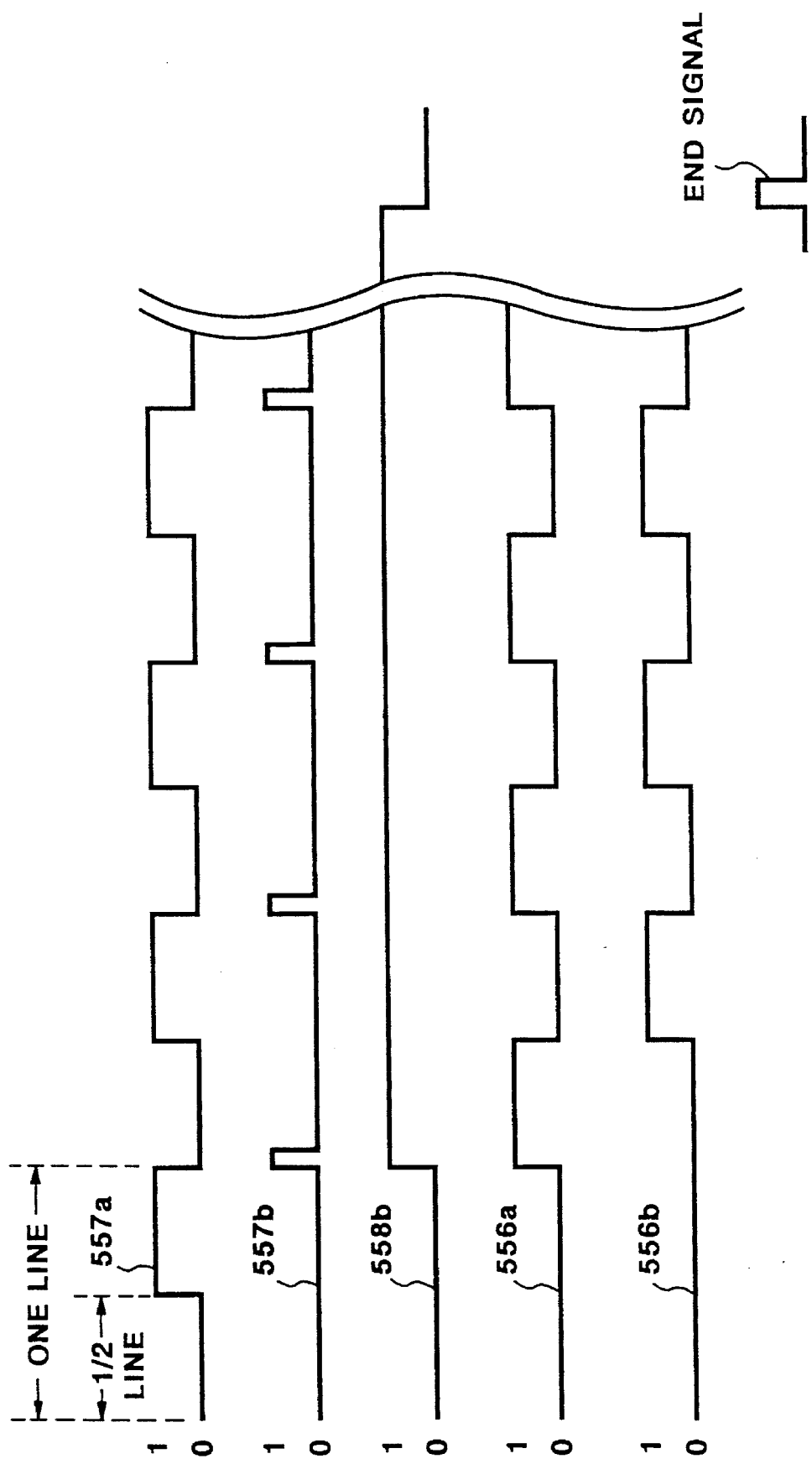
FIG. 22 is a timing chart showing various signals handled by the controller of FIG. 21.

FIG. 21 is a block diagram showing the detailed construction of the controller 550 depicted in FIG. 16. In FIG. 21, the controller 550 includes a counter 551 for counting the number of pixels in one line in the main scanning direction, a J-K-type flip-flop 552, AND gates 553a and 553b, and an inverter 553c.

The binary results from the binarization unit 350 are outputted on line 360, and the counter 551 performs a counting operation in synchronization with this output. More specifically, a signal synchronized with the transfer of the binary results is inputted to the clock input of the counter 551. The counter 551 also counts the number of pixels in one line. When the number of pixels in one half of a line has been counted, as shown in the timing chart of FIG. 22, a "1" is outputted on signal line 557a. Furthermore, when the number of pixels in the remaining half of the line has been counted, a carrier signal "1" is outputted on line 557b. In other words, "1" is outputted on signal line 557a when the counter 551 has counted the number of pixels in one half of a line, and "1" is outputted on signal line 557b when the counter 551 has counted the number of pixels in one line.

Initially, when the counter 551 has counted the number of pixels in one line, the carrier signal "1" from the signal line 557b enters the J terminal of the flip-flop 552. As a result, the flip-flop 552 is set, and a "1" signal from the Q-output terminal of the flip-flop 552 is outputted on signal line 558b. The signal line 558b is connected to one input terminal of each of the AND gates 553a, 553b.

During the counting of the number of pixels on the next line, a "0" is outputted on signal line 557a when the number of pixels in one half of the initial line is being counted. Since this signal enters the AND gate 553a via the inverter 553c, "1" is outputted by the AND gate 553a. Accordingly, "1" is outputted on output signal line 556a of the AND gate 553a, and the memory 540 shown in FIG. 16 is enabled so that the stored contents can be read out.

Next, a "1" is outputted on signal line 557a when the number of pixels in the remaining half of the initial line is being counted. This signal enters the AND gate 553b. Since the AND condition of this gate is satisfied, a "1" is outputted on the output signal line 556b. In response to the output of "1" on signal line 556b, the memory 541 shown in FIG. 16 is enabled so that the stored contents can be read out.

The speed at which data is read out of the memory 540 or 541 is twice that at which the data is written in these memories. More specifically, during the time that "1" is being outputted on signal line 556a while half of the pixels of one line are being transferred, the memory 540 is enabled and reading is performed at twice the speed. The two bits on signal line 546a enter the shift register 570, the parallel data is converted into serial data, and the serial output is performed on signal line 560 at twice the speed.

Next, during the time that the remaining half of the pixels of one line are being transferred, "1" is outputted on signal line 556b and the memory 541 is enabled. Operation identical to that described above is performed in response to the output on signal line 546b.

Finally, when the entire operation ends, an end signal is applied to the K-terminal of the flip-flop 552 to reset this flip-flop. As a result, a "0" is delivered from the Q-terminal and the AND gates 553a, 553b shut down.

In accordance with this embodiment, as described above, low-density areas of a binarized imaged are sensed, the dots present in the low-density areas are split into dots having a higher resolution, and these dots are outputted. As a result, it is possible to obtain a reproduced image having a high resolution and little graininess without increasing the size of a page memory.

[Second Embodiment (FIGS. 23–27)]

The present invention is not limited to the resolution conversion described in the first embodiment. It goes without saying that an arrangement in which a conversion is made to high resolution followed by recording also is covered by the present invention. In this embodiment, a case will be described in which dots are split and outputted by making the resolution four times greater in the main scanning direction and two times greater in the subordinate scanning direction.

Reference will be had to the drawings to describe the procedure for executing the division into small dots, as well as the contents of the LUT, centered mainly on the resolution converting circuit 500 that characterizes this embodiment. Portions of the apparatus identical with those already described are designated by like reference characters and need not be described again.

Figure 23:
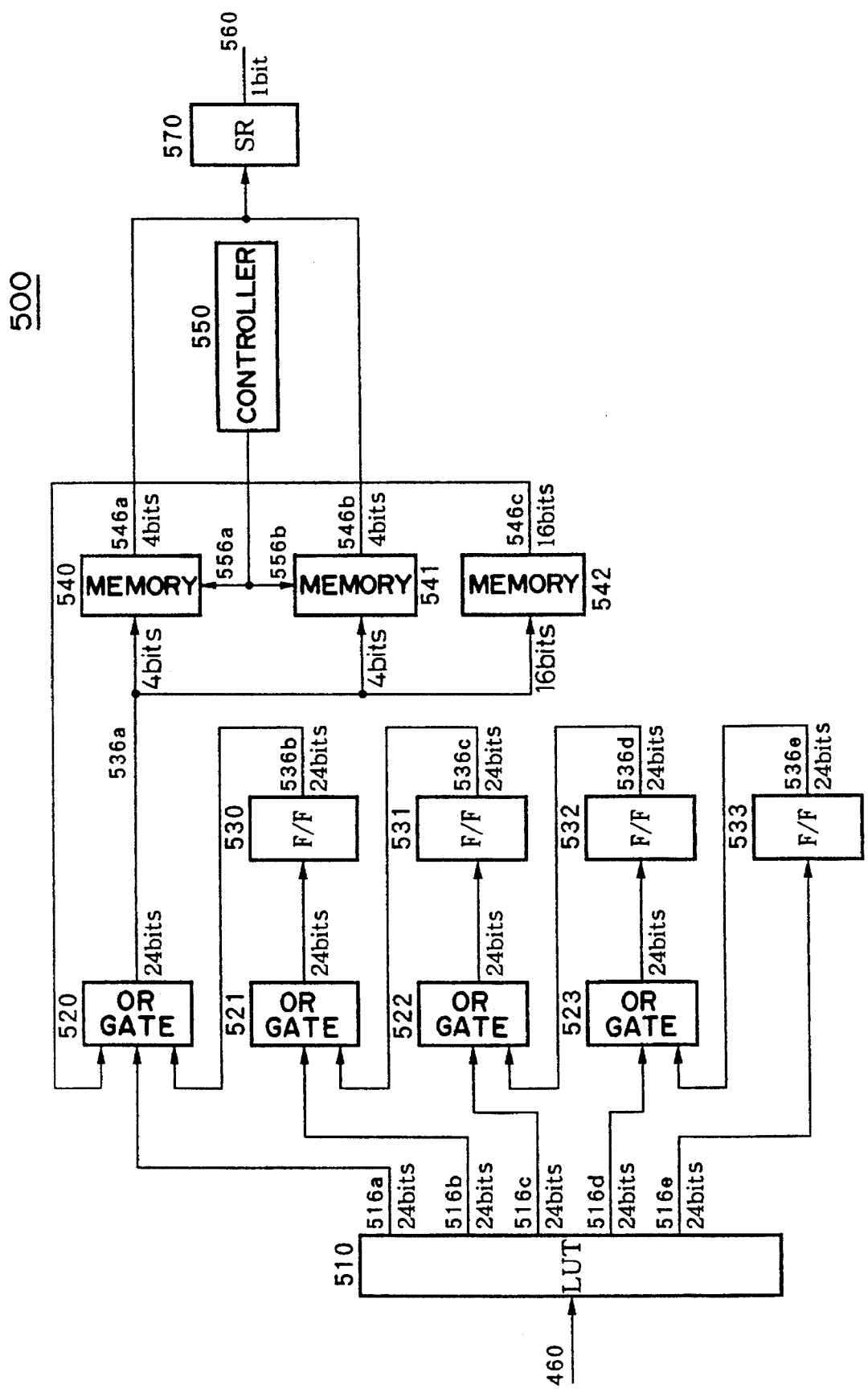
FIG. 23 is a block diagram showing the detailed construction of a resolution converting circuit according to a second embodiment.

FIG. 23 is a block diagram illustrating the detailed construction of the resolution converting circuit 500 according to this embodiment. In FIG. 23 also, the resolution converting circuit 500 is substantially the same as that shown in FIG. 16 already described in connection with the first embodiment. Portions that are different are merely the bit structures of the various circuits. Accordingly, the reference numerals of these circuits are the same as those shown in FIG. 16 and these circuits need not be described again. In FIG. 23, numerals 540–542 denote FIFO memories for storing two lines of binary results and having respectively 4 bits, a 4 bits and a 16 bits input/outputs.

Figures 24, 25:
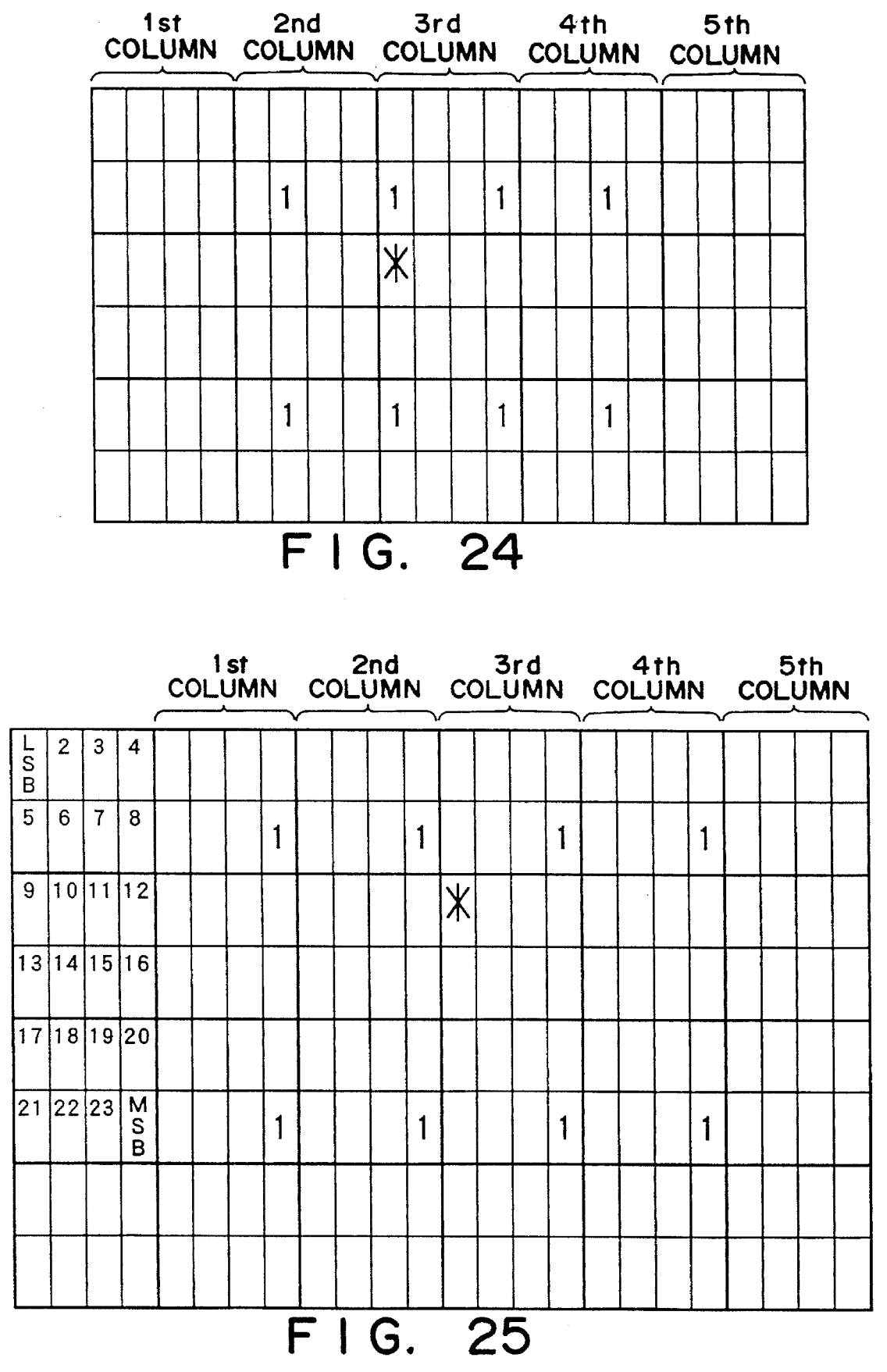

FIG. 24 is a diagram showing an example in which a black dot (*), which is located in a small window area, is split or sub-divided into small dots of higher resolution in accordance with this embodiment. FIG. 25 is a diagram showing an example in which a black dot (*), which is located in a large window area, is split or sub-divided into small dots of higher resolution. As will be understood from FIGS. 24 and 25, the black dots (*) are dispersed nearby in the small window area and more distantly in the large window area.

FIG. 26 is a diagram showing the contents of the LUT 510 depicted in FIG. 23. In FIG. 26, patterns of $1^{st}$, $2^{nd}$, $3^{rd}$, $4^{th}$ and $5^{th}$ columns are generated on signal lines 516a, 516b, 516c, 516d, 516e, respectively.

In a case where data on signal line 460a from the binary data monitoring unit 400 is "0", i.e., when the pixel of interest is white, "0" is outputted as two dots in the main and subordinate scanning directions regardless of the data on the signal lines 460b and 460c from other window areas. Accordingly, as shown in FIG. 26, the signal line 516a of the $1^{st}$ column, the signal line 516b of the $2^{nd}$ column, the signal line 516c of the $3^{rd}$ column (which is that of the pixel of interest), the signal line 516d of the $4^{th}$ column and the signal line 516e of the $5^{th}$ column of LUT 510 together output "0" for all 12 bits from the LSB to the MSB. These outputs enter the OR gates 520–523 and the flip-flop 533, respectively.

In a case where the data on signal line 460a from the binary data monitoring unit 400 is "1", i.e., when the pixel of interest is a black dot, and there was no "1" (black dot) in the large window area, i.e., when the outputs on the signal lines 460b and 460c are both "0", the "1"s (black dots) are dispersed far from the pixel of interest (the pixel marked by "*" in FIG. 25), as illustrated in FIG. 25. Accordingly, as depicted in FIG. 26, the LUT 510 produces the following outputs in the bit-order mentioned starting from the LSB:

"000000010000000000000001", as the data of the $1^{st}$ column, from signal line 516a;
"000000010000000000000001", as the data of the $2^{nd}$ column, from signal line 516b;
"000000010000000000000001", as the data of the $3^{rd}$ column, from signal line 516c;
"000000010000000000000001", as the data of the $4^{th}$ column, from signal line 516d; and
"000000000000000000000000", as the data of the $5^{th}$ column, from signal line 516e. These outputs enter the OR gates 520–522 and flip-flop 533, respectively.

In a case where the signal on signal line 460a from the binary data monitoring unit 400 is "1", i.e., the pixel of interest is a black dot, there was no "1" in the small window area but only in the window area outside this area, i.e., if the outputs on signal lines 460b and 460c are "0" and "1", respectively, the "1"s (black dots) are dispersed near the pixel of interest (the pixel marked by "*" in FIG. 24), as illustrated in FIG. 24. Accordingly, as depicted in FIG. 26, the LUT 510 produces the following outputs in the bit order mentioned starting from the LSB:

"000000000000000000000000", as the data of the $1^{st}$ column, from signal line 516a;
"000001000000000001000000", as the data of the $2^{nd}$ column, from signal line 516b;
"000010010000000100100000", as the data of the $3^{rd}$ column, from signal line 516c;
"000000010000000100100000", as the data of the $4^{th}$ column, from signal line 516d; and
"000000000000000000000000", as the data of the $5^{th}$ column, from signal line 516e. These outputs enter the OR gates 520–522 and flip-flop 533, respectively.

Finally, in a case where the signal on signal line 460a from the binary data monitoring unit 400 is "1", i.e., the pixel of interest is a black dot, and there was a "1" also in the small window area, i.e. , if the outputs on signal lines 460b and 460c are both "1", a "1" (black dot) is simply added in both the main and subordinate scanning directions alongside the pixel of interest. Accordingly, as shown in FIG. 26, the LUT 510 outputs, in the bit order mentioned starting from the LSB, "000000000000000000000000" as the data of the $1^{st}$ and $2^{nd}$ columns from the signal lines 516a and 516b. As the data of the $3^{rd}$ column, "000000001111111100000000" is outputted from the signal line 516c in the order mentioned starting from the LSB. As the data of the $4^{th}$ and $5^{th}$ columns, "000000000000000000000000" is outputted, in the order mentioned starting from the MSB, from both the signal lines 516d and 516e. The data thus outputted enters the OR gates 520–523 and the flip-flop 533, respectively.

The processing of the $1^{st}$ column implemented by the OR gate 520 and memories 540–542 will now be described. Here the content of the LUT 510 shown in FIG. 26 corresponds to the bits shown in FIG. 25.

Figure 27:
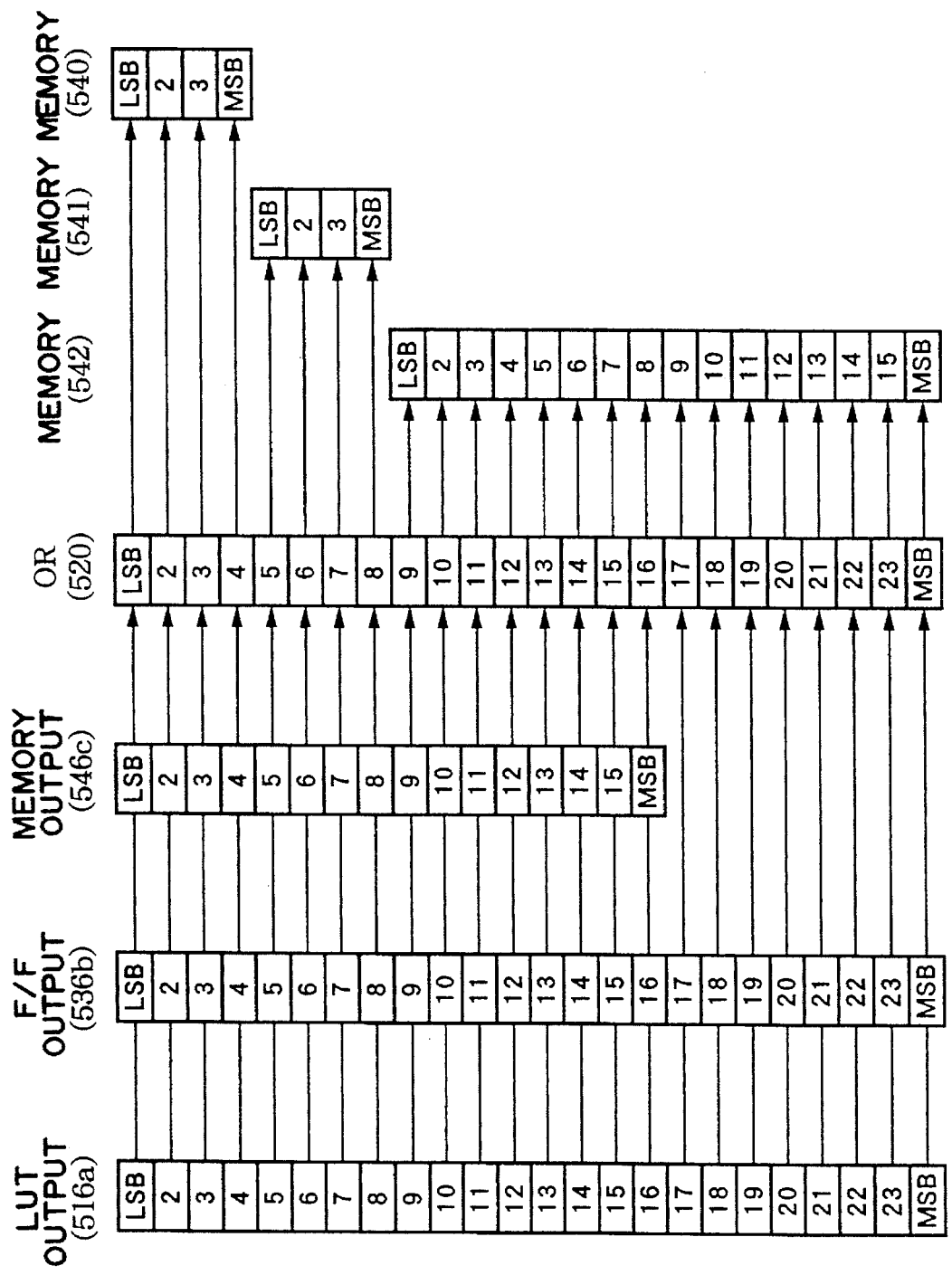
FIG. 27 is a diagram showing the operation performed by an OR circuit illustrated in FIGS. 24 and 25.

The inputs to the OR gate 520 are the 24 bits data outputted from the LUT 510 on signal line 516a, the 24 bits data from output signal line 536b of the flip-flop 530, which has stored the processed results up to the immediately preceding cycle, and a 16 bits data from signal line 546c of the memory 542, which has stored the results of processing from the second line onward. More specifically, as shown in FIG. 27, data from the LSB to the fourth bit on signal line 516a, data from the LSB to the fourth bit on signal line 536b, and data from the LSB to the fourth bit on signal line 546c enter the OR gate 520 from the LSB to the fourth bit, the data is outputted as the processing from the LSB to the fourth bit, and this output enters the memory 540 from the LSB to the MSB, where it is stored.

Next, the data from the fifth bit to the eighth bit on signal line 516a, the data from the fifth bit to the eighth bit on signal line 536b, and the data from the fifth bit to the eighth bit on signal line 546c enter the fifth through eighth bits of the OR gate 520, the data is outputted as the fifth through eighth bits of processing, and this output enters the four bits from LSB to the MSB of the memory 541, where it is stored.

Further, the data from the 9th bit to the 16th bit on signal line 516a, the data from the 9th bit to the 16th bit on the output signal line 536b, and the data from the 9th bit to the MSB on signal line 546c enter the 9th through 16th bits of the OR gate 520, the data is outputted as the 9th through 16th bits of processing, and this output enters the eight bits from the LSB to the eighth bit of the memory 542, where it is stored.

Finally, the data from the 17th bit to the MSB on signal line 516a and the data from the 17th bit to the MSB on the output signal line 536b enter the 17th bit through the MSB of the OR gate 520, the data is outputted as the 17th bit through the MSB of processing, and this output enters the ninth bit to the MSB of the memory 542, where it is stored.

The processing of the $2^{nd}$ column implemented by the OR gate 521 and flip-flop 530 will now be described.

In FIG. 23, the inputs to the OR gate 521 are the 24 bits data outputted from the LUT 510 on signal line 516b, and the 24 bits data from output signal line 536c of the flip-flop 531, which has stored processed results up to the immediately preceding cycle. The data is processed in correspondence with the LSB to the MSB, and the output is inputted to the flip-flop 530 in correspondence with the LSB to the MSB, where the data is stored.

The processing of the $3^{rd}$ and $4^{th}$ columns is executed in the same manner as set forth above. The data outputted on signal line 516e from the LUT 510 is directly inputted to the flip-flop 533, where it is stored as the $5^{th}$ column of processing.

The controller 550 shown in FIG. 23 performs an operation similar to that in the first embodiment. However, since the bit lengths of the memories 540 and 541 are four bits, the 4 bits output from the signal 546a or 546b enters the shift register 570, a conversion is made from parallel to serial data, and a serial output is performed on signal line 560 at four times the speed.

Finally, at the end of transfer of all binary results, the reading of data from the memory is completed in response to an end signal (not shown).

In accordance with this embodiment, as described above, it is obvious that resolution can readily be converted to be any desired number of times greater independently in the main and subordinate scanning directions. In addition, it is possible also to readily convert resolution to be any desired number of times greater solely in the main scanning direction or solely in the subordinate scanning direction.

In accordance with this embodiment, as described above, it is possible to obtain a reproduced image having a high resolution and little graininess without increasing the size of a page memory.

[Third Embodiment (FIGS. 28–30) ]

Figure 28:
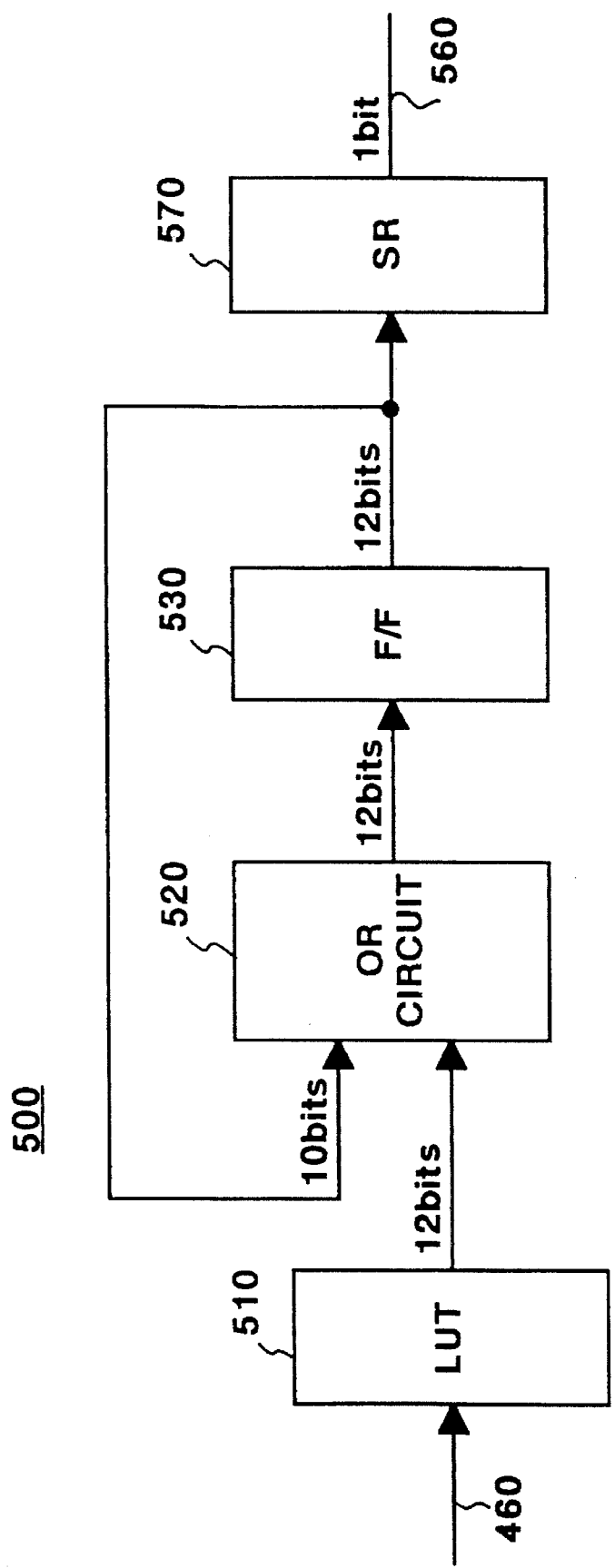
FIG. 28 is a block diagram illustrating the detailed construction of a resolution converting circuit according to a third embodiment.

In this embodiment, a case will be described wherein a binarized image data is subjected to a two-fold resolution conversion in the main scanning direction. FIG. 28 is a block diagram illustrating the detailed construction of the resolution converting circuit 500 according to a third embodiment. As shown in FIG. 28, the converting circuit 500 includes the LUT 510, the OR gate 520, the flip-flop 530 for latching data, and the shift register 570 for converting parallel data into serial data. In comparison with the resolution converting circuits (FIGS. 16 and 23) in accordance with the first and second embodiments, the resolution converting circuit 500 in accordance with this embodiment has basically the same components and the same reference characters are used to identify them.

Figure 29A:
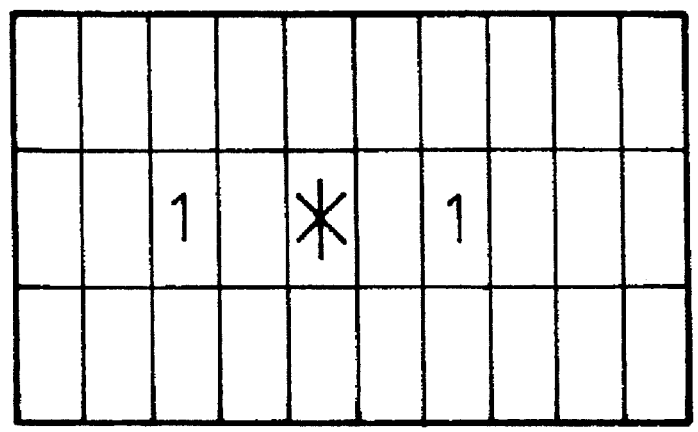
FIGS. 29A and 29B are diagrams for describing image data diffused in accordance with the third embodiment.
Figure 29B:
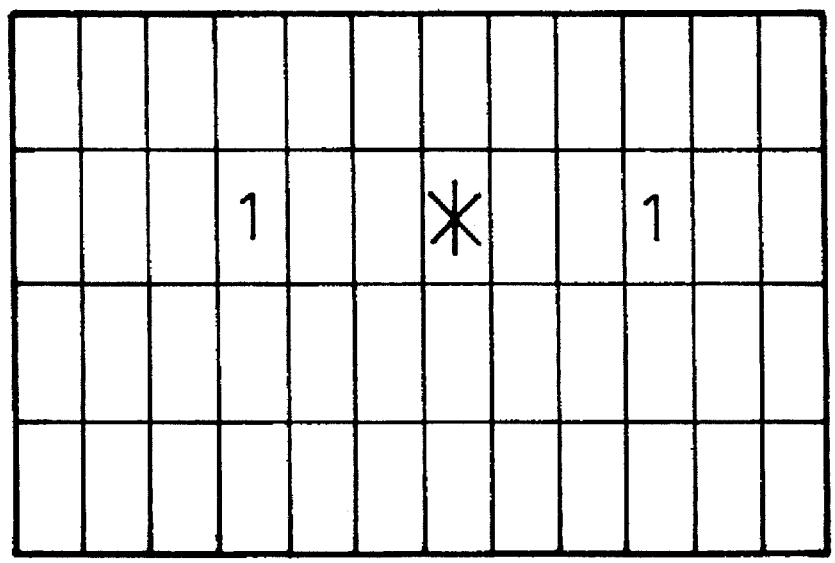

FIG. 29A is a diagram showing a black dot (*), which is located in a small window area, split or subdivided into small dots of higher resolution. FIG. 29B is a diagram showing a black dot (*), which is located in a large window area, split or sub-divided into small dots of higher resolution. As will be understood from FIGS. 29A and 29B, black dots are dispersed near the pixel of interest (*) in the small window area and more distantly in the large window area.

FIG. 30 is a diagram showing the contents of the LUT 510.

In a case where data on signal line 460a from the binary data monitoring unit 400 is "0", i.e., when the pixel of interest is white, control is performed in such a manner that two "0"s appear in the main scanning direction regardless of the data on the signal lines 460b and 460c from other window areas. Two pixels of "0"s are outputted from the output unit 600. Accordingly, as shown in FIG. 30, the LUT 510 outputs "0" data for all 12 bits from the LSB to the MSB. This data enters one input of the OR gate 520. Further, ten bits from the MSB side of the flip-flop 530 are fed back to the other input of the OR gate 520 to enter the same. As a result, the 12 bits data from the OR gate 520 again enters the flip-flop 530 and therefore is rewritten. Furthermore, the 12 bits of the rewritten data outputted by the flip-flop 530 enter the shift register 540, from which two bits are outputted one bit at a time from the LSB side.

In a case where the pixel of interest is "1" (a black dot) and there was no "1" in the large window area, i.e., if the outputs on the signal lines 460b, 460c are both "0" then "1" (a black dot) is diffused far from the pixel of interest, as illustrated in FIG. 29B. Accordingly, the LUT 510 outputs "000100000100" in this order starting from the LSB, as shown in FIG. 30, and this data enters one input of the OR gate 520.

Furthermore, in a case where the pixel of interest is "1" (a black dot) and there was no "1" in the small window area but only in the area on the outside, i.e., if the outputs on the signal lines 460b, 460c are "0" and "1" respectively, then "1" (a black dot) is diffused near the pixel of interest, as illustrated in FIG. 29A. Accordingly, the LUT 510 outputs "000010001000" in this order starting from the LSB, as shown in FIG. 30, and this data enters one input of the OR gate 520.

Finally, in a case where the pixel of interest is "1" (a black dot) and there was a "1" also in the small window area, i.e., if the outputs on signal lines 460b and 460c are both "1", a "1" (black dot) is simply added alongside the pixel of interest. Accordingly, as shown in FIG. 30, the LUT 510 outputs "000000011000" in this order starting from the LSB, and this data enters one input of the OR gate 520.

Thus, the pattern generated by the LUT 510 is applied to the OR gate 520 and the results from the flip-flop 530 storing the pattern which prevailed up to the preceding cycle are fed back to the OR gate 520, whereby a correction is made by the OR gate 520. In other words, the LSB of the output data from the LUT 510 and the third bit of the output from the flip-flop 530 enter the OR gate 520, and these are outputted as the LSB. In addition, the second bit of the output from the LUT 510 and the fourth bit of the output from the flip-flop 530 enter the OR gate 520, and these are outputted as the second bit.

Similarly, the tenth bit of the output from the LUT 510 and the MSB of the output from the flip-flop 530 enter the OR gate 520, and these are outputted as the tenth bit.

Next, the 11th bit and the MSB of the output data from the LUT 510 are outputted directly from the OR gate 520 as data of the 11th bit and MSB.

The foregoing results enter the shift register 540, whereby they are successively outputted two bits at a time from the LSB side.

In accordance with this embodiment as described above, low-density areas of a binarized image are sensed and the dots present in the low-density areas are split up into dots of a higher resolution and printed, whereby it is possible to obtain a reproduced image having a high resolution and little graininess, without increasing the size of a page memory.

[Fourth Embodiment (FIGS. 31–38)]

In this embodiment, a case will be described wherein a binarized image is subjected to a two-fold resolution conversion in the subordinate scanning direction to obtain a reproduced image having a high resolution. In comparison with the shared components described above, the construction of the binary data monitoring unit 400 in this embodiment differs part. Therefore, in the description that follows, reference will be had to the drawings to describe primarily the binary data monitoring unit 400 and the resolution converting circuit 500, which characterize this embodiment.

<Description of Binary Data Monitoring Unit 400 (FIGS. 31–36)>

Figure 31:
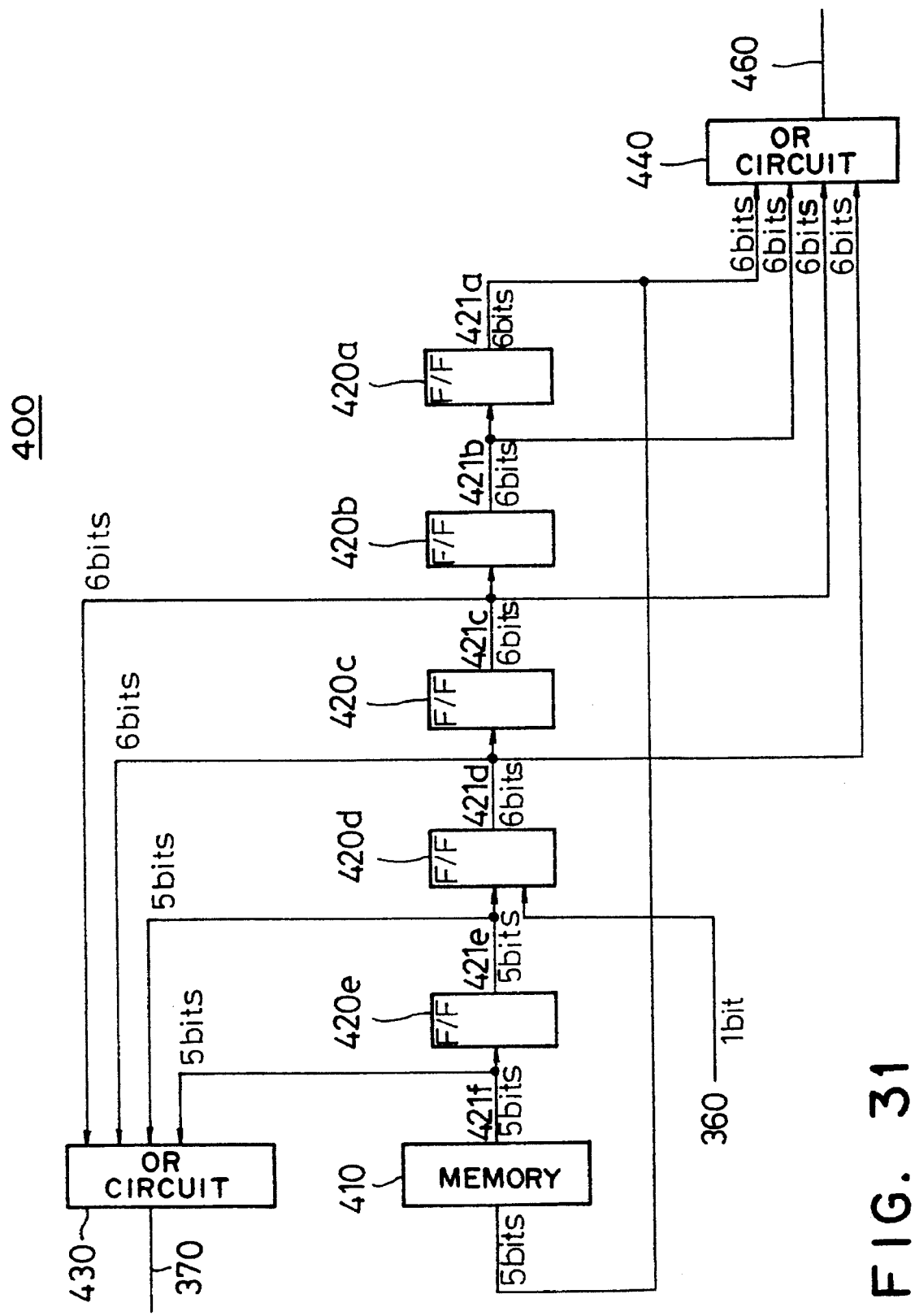
FIG. 31 is a block diagram illustrating the detailed construction of a binary monitoring unit in accordance with a fourth embodiment.

FIG. 31 is a block diagram showing the detailed construction of the binary data monitoring unit 400 in accordance with this embodiment. As shown in FIG. 31, the monitoring unit 400 includes a FIFO memory which has 5 bits input/output and is capable of storing five lines of binary results, flip-flops 420a–420e for latching data, and OR circuit units 430, 440. The circuit construction of FIG. 31 is substantially the same as that of the binary data monitoring unit shown in FIG. 10, and therefore the same reference characters are assigned. The difference between the two is the number of flip-flop circuits and the number of bits in the data outputted by these circuits.

Binarized data (five bits) is read out of the memory 410 successively in synchronization with the clock, and this data is inputted to the flop-flop 420e. Thereafter, the data is shifted to the flip-flops 420d–420a successively in synchronization with the clock pulses. Meanwhile, binarized data "1" or "0" is inputted from the signal line 360 to the MSB of the flip-flop 420d as the results processed by the binarizing circuit 300. Accordingly, the output of the flip-flops 420d–420a is six bits.

Figures 34, 35:
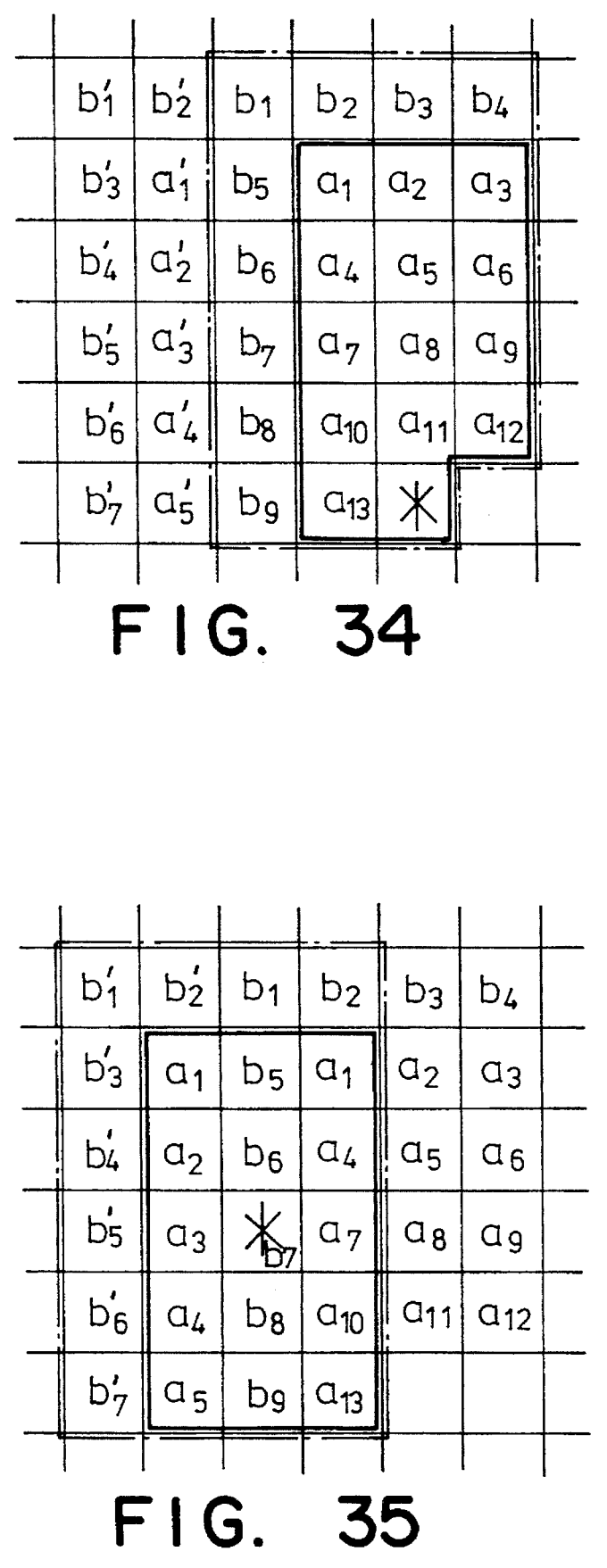

The binarized results ($b_1'$, $b_3'$, $b_4'$, $b_5'$, $b_6'$, $b_7'$) shown in FIGS. 34, 35 are latched, order from the least significant bit, in the flip-flop 420a. Similarly, the six bits ($b_2'$, $a_1'$, $a_2'$, $a_3'$, $a_4'$, $a_5'$) are latched in the flip-flop 420b; the six bits ($b_1$, $b_5$, $b_6$, $b_7$, $b_8$, $b_9$) in the flip-flop 420c; the six bits ($b_2$, $a_1$, $a_4$, $a_7$, $a_9$, $a_{13}$) in the flip-flop 420d; and the five bits ($b_3$, $a_2$, $a_5$, $a_8$, $a_{11}$) in the flip-flop 420e. The five bits ($b_4$, $a_3$, $a_6$, $a_9$, $a_{12}$) are outputted by the memory 410.

The six bits, six bits and five bits from the respective flip-flops 420c –420e, as well as the five bits from the memory 410, enter the OR gate portion 430.

The six bits from each of the flip-flops 420a 420d enter the OR gate portion 440.

Figure 32:
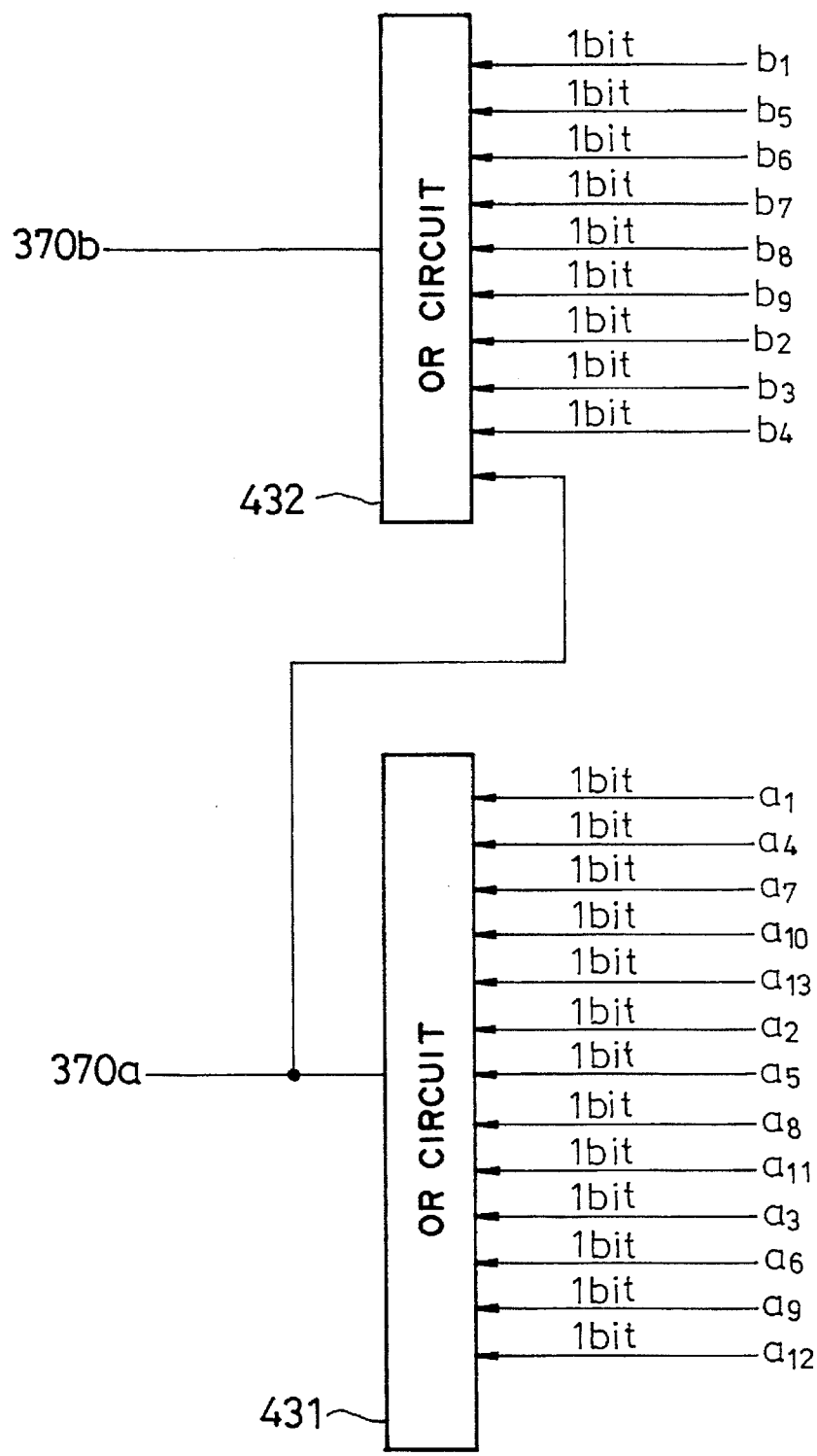
FIG. 32 is a detailed circuit diagram of an OR circuit shown in FIG. 31.

FIG. 32 is a block diagram showing the detailed construction of the OR gate unit 430 depicted in FIG. 31. In FIG. 31, numerals 431 and 432 denote OR circuits.

The inputs to the OR circuit 431 are the five bits ($a_1$, $a_4$, $a_7$, $a_{10}$, $a_{13}$) of the data outputted on the output signal line 421d from the flip-flop 420d, the four bits ($a_2$, $a_5$, $a_8$, $a_{11}$) of the signal from the flip-flop 420e, and the four bits ($a_3$, $a_6$, $a_9$, $a_{12}$) of the signal 420f from the memory 410. The OR circuit 431 detects whether even one of these inputs is "1" (a black dot).

The inputs to the OR circuit 432 are the six bits ($b_1$, $b_5$, $b_6$, $b_7$, $b_8$, $b_9$) of the data outputted on the output signal line 421c from the flip-flop 420c, the single bit ($b_2$) of the data outputted on the output signal line 421d from the flip-flop 420d, the single bit ($b_3$) of the data outputted on the output signal line 421e from the flip-flop 420e, and the single bit ($b_4$) of the data outputted on the output signal line 421f from the memory 410. The OR circuit 432 detects whether even one of these inputs is "1" (a black dot).

Thus, the binary data monitoring unit 400 in accordance with this embodiment detects whether there is a "1" (a black dot) in two window areas of different sizes, and the result is outputted on signal lines 370a and 370b.

FIG. 33 is a block diagram showing the detailed construction of the OR circuit unit 440 depicted in FIG. 31. In FIG. 33, numerals 441 and 442 denote OR circuits.

The character $b_7$ shown in FIG. 33 is one bit of the signal on signal line 421c from the flip-flop 420c and is outputted on signal line 460a. This is also the binarized result of the pixel of interest in the binary data monitoring window for conversion of resolution.

The inputs to the OR circuit 441 are the five bits ($a_1'$, $a_2'$, $a_3'$, $a_4'$, $a_5'$) of the data outputted on output signal line 421b from the flip-flop 420b, the four bits ($b_5$, $b_6$, $b_8$, $b_9$) of the data outputted on the output signal line 421c from the flip-flop 420c, and the five bits ($a_1$, $a_4$, $a_7$, $a_{10}$, $a_{13}$) of the data outputted on the output signal line 421d from the flip-flop 420d. The OR circuit 441 detects whether even one of these inputs is "1" (a black dot).

The inputs to the OR circuit 442 are the six bits ($b_1'$, $b_3'$, $b_4'$, $b_5'$, $b_6'$, $b_7'$) of the data outputted on the output signal line 421a from the flip-flop 420a, the bit ($b_2'$) of the data outputted on the output signal line 421b from the flip-flop 420b, the bit ($b_1$) of the data outputted on the output signal line 421c from the flip-flop 420c, the bit ($b_2$) of the data outputted on the output signal line 421d from the flip-flop 420d, and the output signal 460b from the OR circuit 441. The OR circuit 442 detects whether even one of these inputs is "1" (a black dot).

It is detected whether there is a "1" (a black dot) in two window areas of different sizes as a result of binarizing the pixel of interest, and the result of detected is outputted on signal lines 460a–460c.

Figure 36:
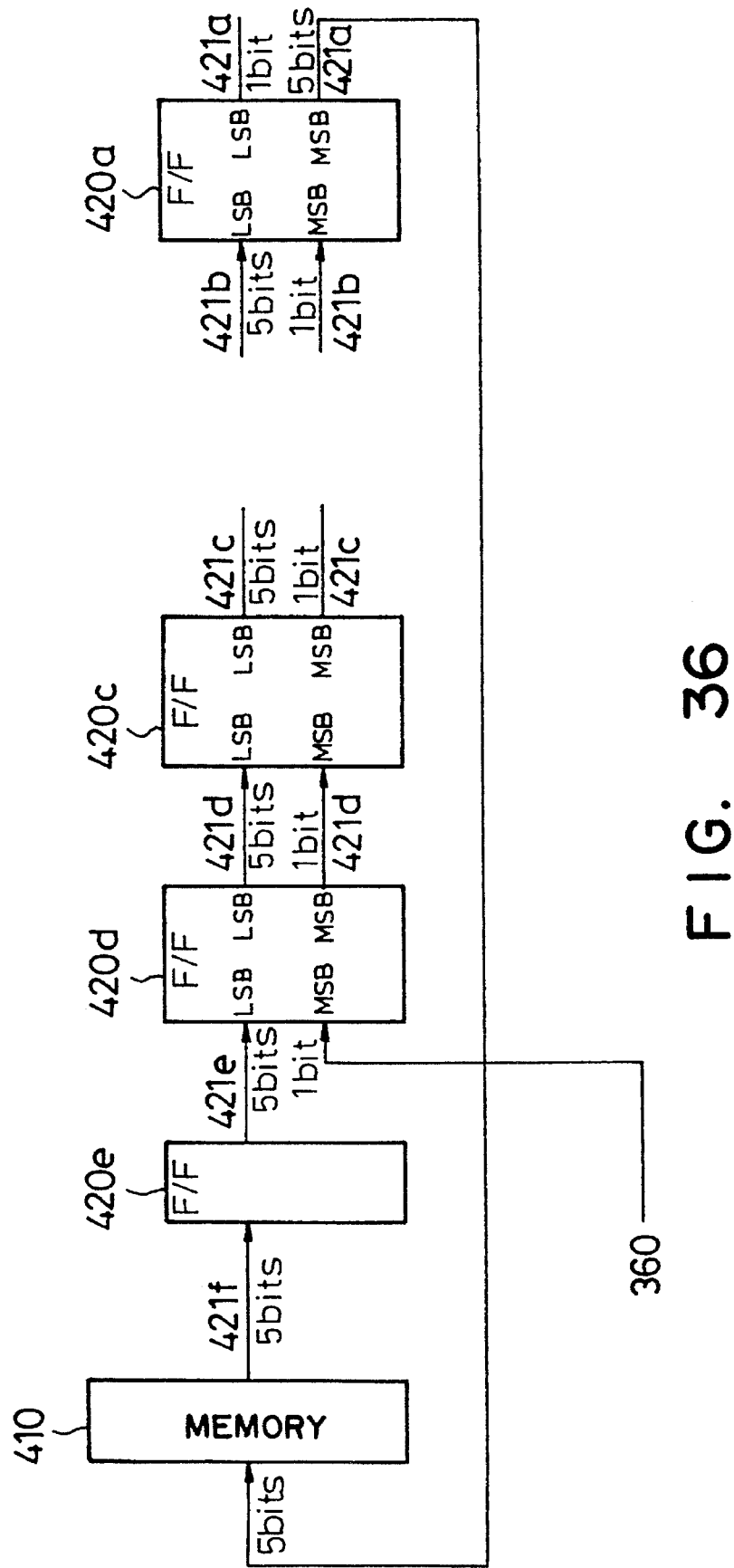
FIG. 36 is a connection diagram showing the connections between a memory and flip-flops illustrated in FIG. 31.

FIG. 36 is a diagram for describing the detailed flow of data through the memory 410 and flip-flops 420a–420e shown in FIG. 31.

When the series of processing operations ends in the above-described arrangement, the pixel of interest is shifted by one pixel to update the data in the window, and the foregoing processing is then repeated. At the end of processing, the five higher order bits ($b_3'$, $b_4'$, $b_5'$, $b_6'$, $b_7'$) of the data in flip-flop 420a are fed back to and stored in the five-line buffer 410 in order to be used in the next line of processing. Accordingly, the five higher order bits ($b_3'$, $b_4'$, $b_5'$, $b_6'$, $b_7'$) of the data outputted on the output signal line 421a from flip-flop 420a are fed back to and stored in the memory 410.

At the same time, the result of binarization is inputted through signal line 360 to the MSB side of the flip-flop 420d, where the data is latched.

Thus, the data in the flip-flops is shifted successively in synchronization with the clock, and the processed data in the flip-flops is stored in the five-line memory.

<Description of Resolution Converting Circuit 500 (FIGS. 37, 38)>

Figure 38:
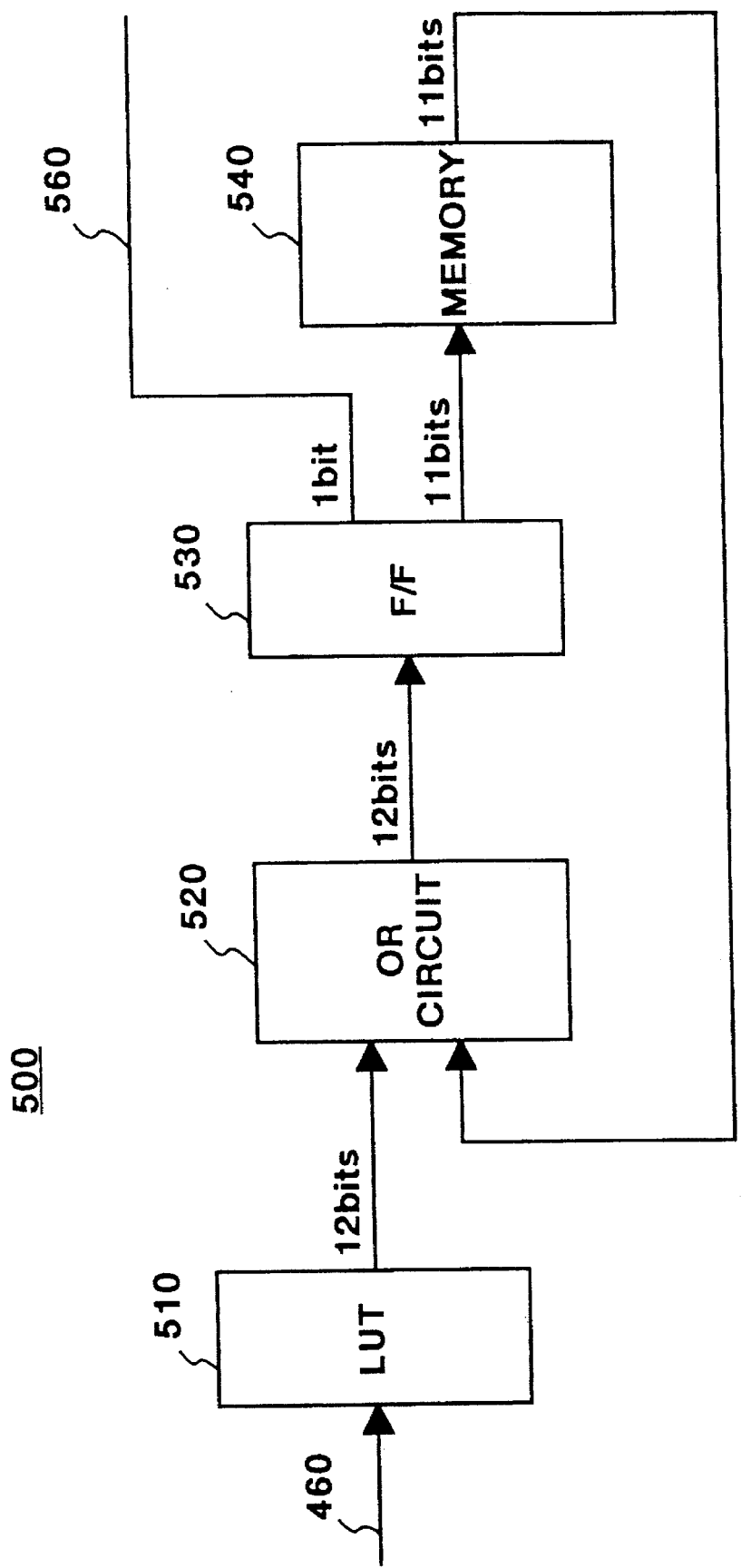
FIG. 38 is a block diagram illustrating the detailed construction of a resolution converting circuit according to the fourth embodiment.

FIG. 38 is a block diagram illustrating the detailed construction of the resolution converting circuit 500 according to this embodiment. As shown in FIG. 38, the converting circuit 500 includes the LUT 510, the OR gate 520, the flip-flop 530 for latching data, and the FIFO memory 540 for storing 11 lines of binary results and having 11 bits input/outputs. The content of LUT 510 is the same as that of the LUT shown in FIG. 30 described above.

Figure 37A:
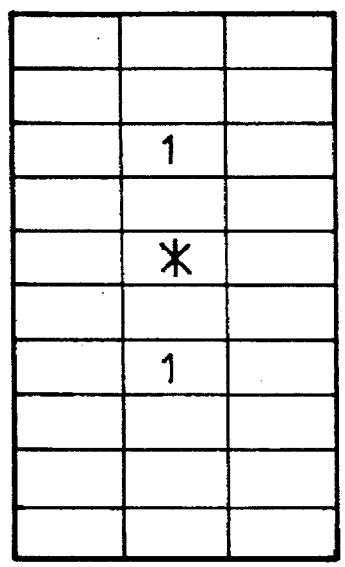
FIGS. 37A and 37B are diagrams for describing image data diffused in accordance with the fourth embodiment.
Figure 37B:
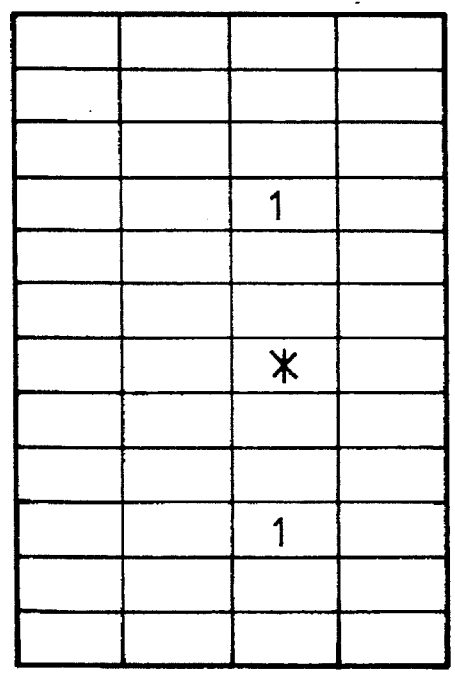

FIG. 37A is a diagram showing a black dot (*), which is located in a small window area, split or subdivided into small dots of higher resolution. FIG. 37B is a diagram showing a black dot (*), which is located in a large window area, split or sub-divided into small dots of higher resolution. As will be understood from FIGS. 37A and 37B, dots are dispersed near the black dot (*), which is the pixel of interest, in the small window area and more distantly in the large window area.

In a case where data on signal line 460a from the binary data monitoring unit 400 is "0", i.e., when the pixel of interest is white, two pixels of "0"s are outputted in the subordinate scanning direction regardless of the data value on the signal lines 460b and 460c from other window areas. Accordingly, as shown in FIG. 30, the LUT 510 outputs "0" data for all 12 bits from the LSB to the MSB. This data enters one input of the OR gate 520. Further, all 11 bits of output data from the memory 540 storing the results of processing which prevailed up to the preceding cycle are fed back in sequence from the LSB side and inputted to the other input of the OR gate 520. As a result, the output from the memory 540 is again inputted to the flip-flop 530 and therefore is rewritten.

In a case where the pixel of interest is "1" (a black dot) and there was no "1" in the large window area, i.e., if the outputs on the signal lines 460b, 460c are both "0", then "1" (a black dot) is diffused far from the pixel of interest, as illustrated in FIG. 37B. Accordingly, the LUT 510 outputs "000100000100" in this order starting from the LSB, as shown in the LUT of FIG. 30, and this data enters one input of the OR gate 520.

Furthermore, in a case where the pixel of interest is "1" (a black dot) and there was no "1" in the small window area but only in the area on the outside, i.e., if the outputs on the signal lines 460b, 460c are "0" and "1", respectively, then "1" (a black dot) is diffused near the pixel of interest, as illustrated in FIG. 37A. Accordingly, the LUT 510 outputs "000010001000" in this order starting from the LSB, as shown in the LUT of FIG. 30, and this data enters one input of the OR gate 520.

Finally, in a case where the pixel of interest is "1" and there was a "1" also in the small window area, i.e., if the outputs on signal lines 460b and 460c are both "1", a "1" (black dot) is simply added alongside (in the subordinate scanning direction) the pixel of interest. Accordingly, as shown in the LUT of FIG. 30, the LUT 510 outputs "000000110000" in this order starting from the LSB, and this data enters one input of the OR gate 520.

Thus, the pattern generated by the LUT 510 is applied to the OR gate 520, and the 11 bits fed back from the memory 540 storing the pattern which prevailed up to the preceding cycle are inputted to the OR gate 520 from the LSB side. The OR gate 520 performs a logical OR operation of each of these bits and applies the resulting bits to the flip-flop 530.

In other words, the LSB of the output from the LUT 510 and the LSB of the output from the memory 550 both enter the OR gate 520, and these are outputted as the LSB. In addition, the second bit of the output from the LUT 510 and the second bit of the output from the memory 550 enter the OR gate 520, and these are outputted as the second bit.

Thereafter, and in similar fashion, the 11th bit of the output from the LUT 510 and the MSB of the output from the memory 550 enter the OR gate 520, and these are outputted as the 11th bit. The MSB of the output from the LUT 510 is outputted directly from the OR gate 520 as the MSB. The LSB of the output from the flip-flop 530 is not delivered to the memory 550. This signal is outputted on signal line 560 to serve as the output signal.

In accordance with this embodiment as described above, conversion of the resolution of the binarized image is executed in the subordinate scanning direction so that the image can be outputted upon having its resolution doubled by the conversion.

[Fifth Embodiment (FIGS. 39–42)]

In this embodiment, a case will be described wherein conversion of the resolution of a binarized image is executed in a direction diagonal to the main scanning direction to split up dots. The splitting up of dots into smaller dots and the contents of the LUT will be described with reference to the drawings, based primarily upon the description of the resolution converting circuit 500 characterizing this embodiment.

Figure 39:
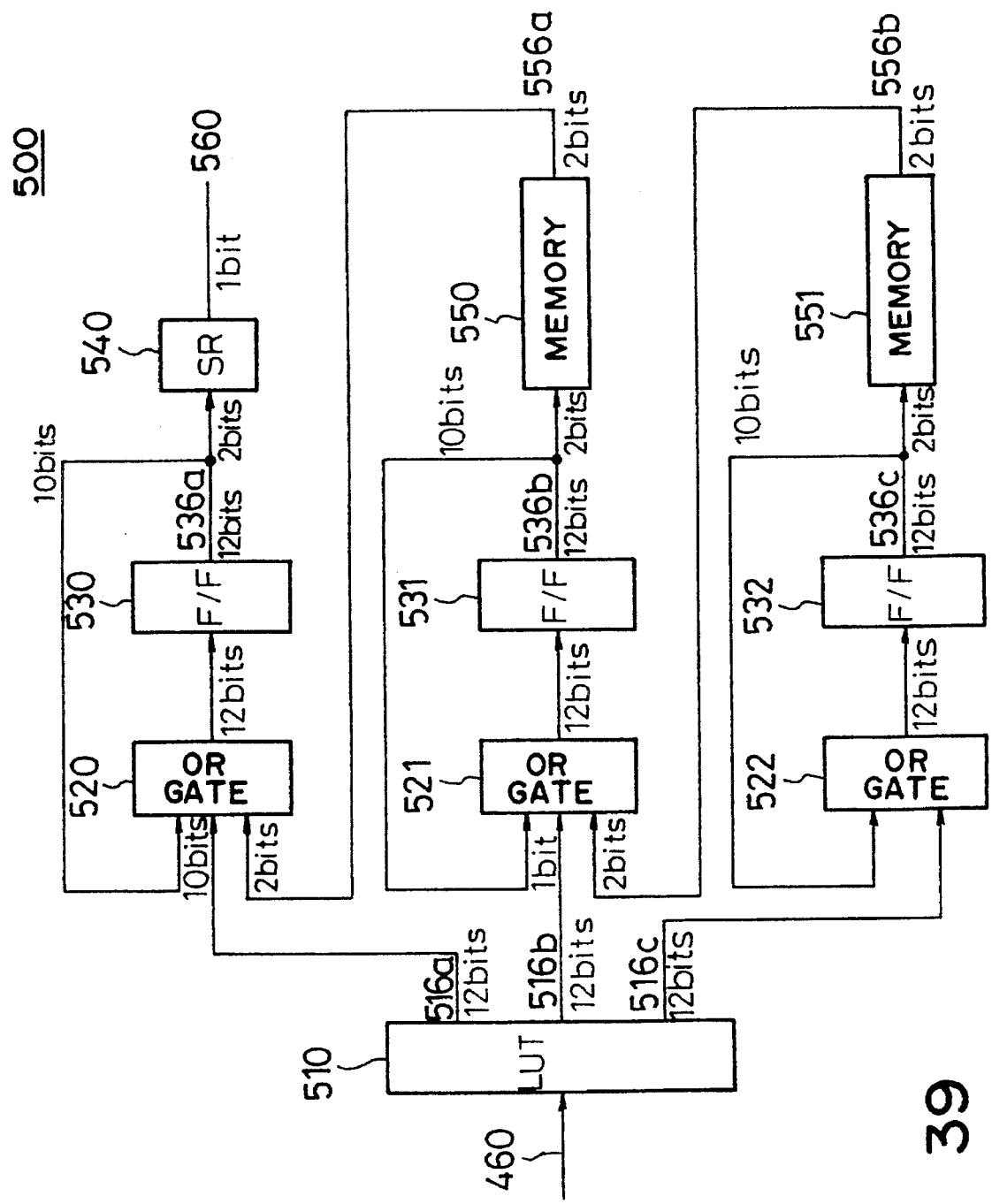
FIG. 39 is a block diagram illustrating the detailed construction of a resolution converting circuit according to a fifth embodiment.

FIG. 39 is a block diagram illustrating the detailed construction of the resolution converting circuit 500 according to this embodiment. As shown in FIG. 39, the converting circuit 500 includes the LUT 510, the OR gates 520–522, the flip-flops 530–532 for latching data, the FIFO memories 550, 551 for storing one line of binary results and having a 2 bits input/outputs, and the shift register 540 for converting parallel data into serial data.

Figure 40A:
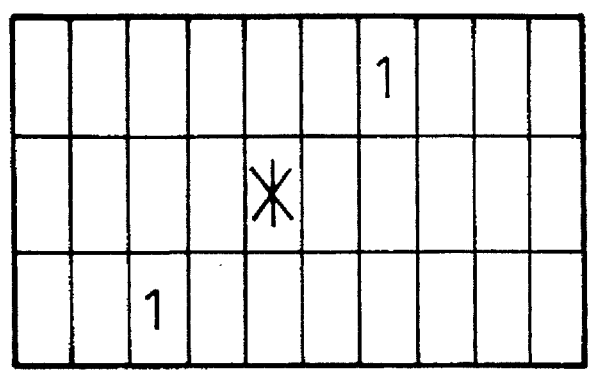
FIGS. 40A and 40B are diagrams for describing image data diffused in accordance with the fifth embodiment.
Figure 40B:
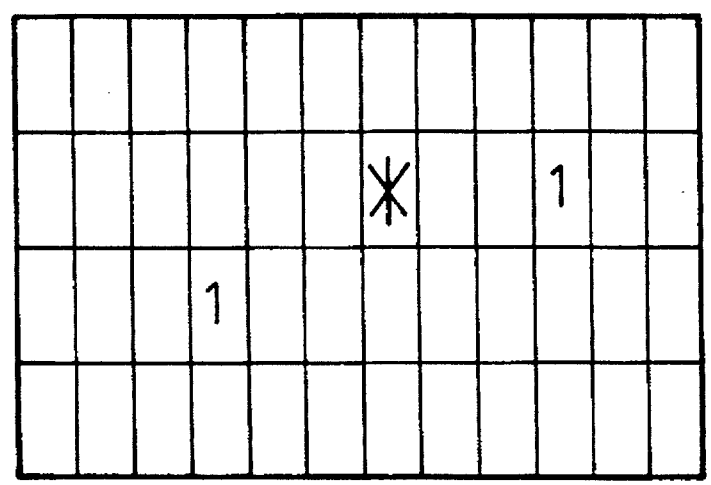

FIG. 40A is a diagram showing a black dot (*), which is located in a small window area, split or subdivided into small dots of higher resolution. FIG. 40B is a diagram showing a black dot (*), which is located in a large window area, split or sub-divided into small dots of higher resolution. As will be understood from FIGS. 40A and 40B, dots are dispersed near the black dot (*) in the small window area and more distantly in the large window area in this embodiment as well.

Figure 41:
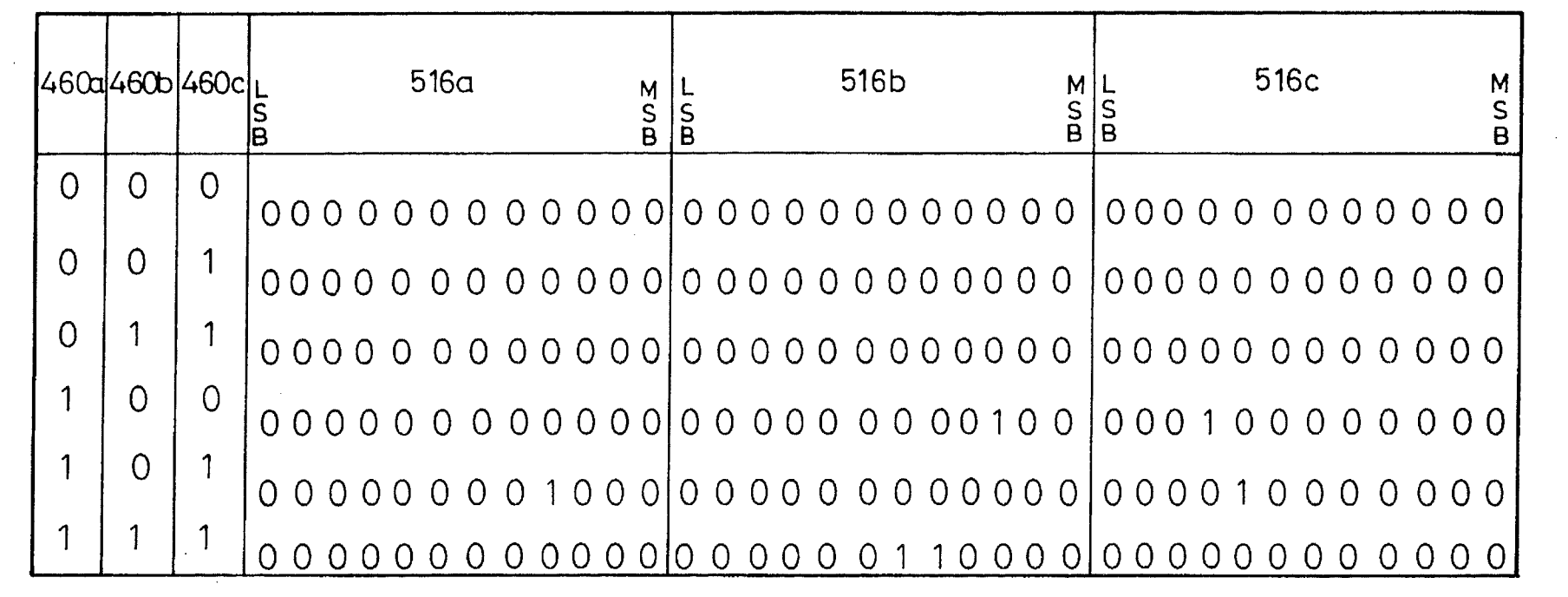

FIG. 41 is a diagram showing the contents of the LUT 510 depicted in FIG. 39. Signal lines 516a, 516b, 516c respectively generate the first, second and third lines of a pattern.

In a case where data on signal line 460a from the binary data monitoring unit 400 is "0", i.e., when the pixel of interest is white, two pixels of "0"s are outputted in the main scanning direction regardless of the contents of the data on the signal lines 460b and 460c from other window areas. Accordingly, as shown in FIG. 41, the LUT 510 outputs "0" data for all 12 bits from the LSB to the MSB on the signal line 516a of the first line, the signal line 516b of the second line, which is that of the pixel of interest, and the signal line 516c of the third line. This output enters the OR gates 520–522.

The processing of a line executed using the OR gate 520, flip-flop 530 and shift register 540 will now be described.

The inputs to the OR gate 520 are the 12 bits data outputted from the LUT 510 on signal line 516a, the 10 bits data, from the MSB side, of the 12 bits of output data from the flip-flop 530, which has stored the processed results up to the immediately preceding cycle, and a 2 bits data on signal line 556a from the memory 550, which has stored the results of processing from the second line onward.

More specifically, as shown in FIG. 42, the third bit of data outputted on signal line 536a and the LSB of the data outputted on signal line 556a enter the LSB side of the OR gate 520, the data is outputted as the processing on the LSB side, and this output enters the LSB of the flip-flop 530. The second bit of output data on signal line 516a, the fourth bit of output data on signal line 536a and the second bit of data outputted on signal line 556a enter the second bit of the OR gate 520, the data is outputted as the second bit of processing, and this output enters the second bit of the flip-flop 530. Furthermore, the third bit of data outputted on signal line 516a and the fourth bit of the data outputted on signal line 536a enter the third bit of the OR gate 530, the data is outputted as the third bit of processing, and this output enters the third bit of the flip-flop 530.

Thereafter, and in similar fashion, the tenth bit of the data outputted on signal line 516a and the MSB of the data outputted on signal line 536a are inputted to the tenth bit of the OR gate 520, and these are outputted as the tenth bit of processing. This output enters the tenth bit of the flip-flop 530.

The 11th bit and the MSB of the data outputted on signal line 516a are inputted directly to the 11th bit and MSB of the flip-flop 530. The LSB and the second bit of the data outputted from the flip-flop 530 enter the shift register 540, whence they are outputted as a 2 bits serial.

The processing of the second line, at which the pixel of interest is located, executed using the OR gate 521, flip-flop 531 and memory 550 will now be described.

The operation regarding the second line is similar to that of the first line described above, and the data which passes through the signal line 556b from memory 551 enters instead of the data which passes through the signal line 556a from memory 550. Accordingly, the LSB and the second bit of data outputted on the signal line 516b, the third and fourth bits of data outputted on the signal line 536b from the flip-flop 531, and the LSB and the second bit of data outputted on the signal line 556b from the memory 551 respectively enter the LSB and second bit of the OR gate 521, and the result of processing is inputted to the LSB and the second bit of the flip-flop 531. The third through tenth bits of data outputted on the signal line 516b and the fifth bit through MSB of the output data from the flip-flop 531 respectively enter the third through tenth bits of the OR gate 521, and the result of processing is inputted to the third through tenth bits of the flip-flop 531. Furthermore, the 11th bit and the MSB of the data outputted on signal line 516b are inputted directly to the 11th bit and MSB of the flip-flop 531. The LSB and the second bit of the data outputted from the flip-flop 531 are written in the LSB and second bit of the memory 550.

Finally, the processing of the third line executed using the OR gate 522, flip-flop 532 and memory 551 will be described.

The operation regarding the third line is similar to that described above but, unlike the processing involving the first and second lines, there is no feedback from memory. More specifically, the LSB through the tenth bit of data outputted on the signal line 516c, and the third through MSB of the data outputted on the signal line 536c from the flip-flop 532 respectively enter the LSB through tenth bits of the OR gate 522, and the result of processing is inputted to the LSB through tenth bits of the flip-flop 532. The 11th bit and the MSB of the data outputted on signal line 516c are inputted directly to the 11th bit and MSB of the flip-flop 532. The LSB and the second bit of the data outputted from the flip-flop 532 are written in the LSB and second bit of the memory 551.

If, in the above arrangement, the pixel of interest is "1" (a black dot) and there was no "1" in the large window area, i.e., if the outputs on the signal lines 460b and 460c are both "0", the "1" (black dot) is dispersed far from the pixel of interest and diagonally, as illustrated in FIG. 40B. Accordingly, as depicted in the LUT of FIG. 41, the LUT 510 produces the following outputs in the bit-order mentioned starting from the LSB: "000000000000", as the data of the $1^{st}$ line, from signal line 516a; "000000000100", as the data of the $2^{nd}$ line, from signal line 516b; and "000100000000", as the data of the $3^{rd}$ line, from signal line 516c.

Subsequent processing is similar to that described above; only the data on the signal lines 516a, 516b and 516c changes.

If the pixel of interest is "1" (a black dot), there was no "1" in the small window area but only in the window area outside this area, i.e., if the outputs on signal lines 460b and 460c are "0" and "1", respectively, the "1" (black dot) is dispersed near the pixel of interest and diagonally, as illustrated in FIG. 40A. Accordingly, as depicted in FIG. 41, the LUT 510 produces the following outputs in the bit-order mentioned starting from the LSB: "000000001000", as the data of the $1^{st}$ line, from signal line 516a; "000000000000", as the data of the $2^{nd}$ line, from signal line 516b; and "000010000000", as the data of the $3^{rd}$ line, from signal line 516c.

Subsequent processing is similar to that described above; only the data on the signal lines 516a, 516b and 516c changes.

Finally, in a case where the pixel of interest is "1" (a black dot) and there was a "1" also in the small window area, i.e., if the outputs on signal lines 460b and 460c are both "1", a "1" (black dot) is simply added alongside the pixel of interest. Accordingly, as shown in FIG. 41, the LUT 510 produces the following outputs in the bit-order mentioned starting from the LSB: "000000000000", as the data of the 1$^{st}$ line, from signal line 516a; "000000110000", as the data of the 2$^{nd}$ line, from signal line 516b; and "000000000000", as the data of the 3$^{rd}$ line, from signal line 516c.

Subsequent processing is similar to that described above; only the data on the signal lines 516a, 516b and 516c changes.

In accordance with this embodiment, when conversion of resolution is applied to a binarized image, dots are split up in a direction diagonal to the main scanning direction and the image is outputted upon having its resolution doubled by the conversion.

In each of the embodiments described above, a monochromatic image is dealt with as the image data. However, in a color image processing system comprising the colors Y (yellow), M (magenta), C (cyan) and BK (black), the present invention can be applied in similar fashion to each of the Y, M, C and BK items of data. In such case also, operations and effects almost the same as those described in the foregoing embodiments can be obtained.

Though the error diffusion method is used as the binarization method in the five embodiments described above, this does not impose a limitation upon the invention; other binarization method may also be employed.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising the steps of:

an input step of inputting binary image data;

a resolution converting step of converting a resolution of the binary image data inputted in said input step in a manner such that the binary image data for one pixel becomes data for a plurality of pixels;

a detecting step of detecting a pixel, which is an isolated point, in the binary image data inputted in said input step; and an output step of outputting a light-and-dark image based upon an output obtained in said resolution converting step, wherein, in said resolution converting step, the binary image data for the isolated pixel detected in said detecting step, is diffused into a broader area than an area required for the plurality of pixels obtained in said resolution converting step.

2. The method according to claim 1, wherein said input step includes a binarizing step for inputting multivalue image data and binarizing the multivalue image data, wherein, in said binarizing step, the binarizing processing applied to the multivalue image data is executed by a error diffusion method.

3. An image processing apparatus for applying binarizing processing to multivalue image data so as to produce binary image data, reproducing an image having shades of light and dark based upon the binary image data, and outputting the image, comprising:

input means for inputting the multivalue data;

binarizing means for binarizing the multivalue image data;

detecting means for detecting a pixel, which is an isolated point, in the image data binarized by said binarizing means;

converting means for dividing information indicative of the pixel of the isolated point, which pixel has been detected by said detecting means, into a plurality of pixels and outputting this information; and output means for outputting a light-and-dark image based upon an output from said converting means, wherein said detecting means further comprises:
    searching means which searches for pixels peripheral to said pixel, with regard to each pixel of the binarized image data, in order to detect the isolated point; and
    feedback means for feeding the result of the search performed by said searching means back to said binarizing means, and wherein said search means further comprises:
    narrow-area searching means which searches for peripheral pixels comparatively near said pixel; and
    wide-area searching means which searches for peripheral pixels comparatively far from said pixel.

4. The apparatus according to claim 3, wherein said input means further comprises:

multivalue image memory means for storing multivalue image data corresponding to one page of a light-and-dark image outputted by said output means; and buffer means for buffering a multivalue image data input from said multivalue image memory means and an output of the multivalue image data to said binarizing means.

5. The apparatus according to claim 3, wherein said multivalue image data is data in which one pixel is expressed by eight bits and tones are capable of being expressed in 256 steps.

6. The apparatus according to claim 3, further comprising search-range control means for performing control in such a manner that the range within which the pixels peripheral to said pixel are searched for is decided in accordance with the values of the multivalue data.

7. The apparatus according to claim 3, wherein an area searched by said narrow-area searching means and said wide-area searching means is a rectangular area.

8. The apparatus according to claim 3, wherein said narrow-area searching means detects, by searching for the peripheral pixels, whether said peripheral pixels include a pixel whose value is "1".

9. The apparatus according to claim 3, wherein said wide-area searching means detects, by searching for the peripheral pixels, whether said peripheral pixels include a pixel whose value is "1".

10. The apparatus according to claim 3, wherein said output means further comprises a digital facsimile machine or a digital printer.

11. An image processing apparatus comprising:

input means for inputting binary image data;

detecting means for detecting a pixel, which is an isolated point, in the binary image data inputted by said inputting means;

converting means for dividing information indicative of the pixel of the isolated point, which pixel has been detected by said detecting means, into a plurality of pixels and outputting this information; and output means for outputting a light-and-dark image based upon an output from said converting means, wherein said converting means further comprises:
    discriminating means for determining whether there is a pixel whose value is "1" in the binary image data at the periphery of the pixel of the isolated point detected by said detecting means;
    first diffusing means for diffusing the value of the pixel of the isolated point near the isolated point in a case where said discriminating means has determined that there is a pixel whose value is "1" comparatively near the pixel of the isolated point;
    second diffusing means for diffusing the value of the pixel of the isolated point far from the isolated point in a case where said discriminating means has determined that there is a pixel whose value is "1" comparatively far from the pixel of the isolated point;

third diffusing means for diffusing the value of the pixel of the isolated point to a pixel alongside the isolated point in a case where said discriminating means has determined that there are pixels whose value is "1" comparatively near and comparatively far from the pixel of the isolated point; and control means for performing control in such a manner that resolution is multiplied any integral number of times in the longitudinal direction and/or transverse direction or in the diagonal direction of the image having shade of light and dark outputted by said output means.

12. The apparatus according to claim 11, wherein said converting means further comprises binary image memory means for storing a predetermined number of lines of binary image data diffused by said first, second and third diffusing means and increased in resolution by said control means.

13. The apparatus according to claim 11, wherein said first diffusing means further comprises:

first suppressing means for performing suppression in such a manner that the value of the pixel of the isolated point will not be diffused from the isolated point in a case where the value of the pixel of the isolated point is "0"; and a look-up table (LUT), which corresponds to the magnification of the conversion of resolution, having position information for diffusing the value of the pixel of the isolated point.

14. The apparatus according to claim 11, wherein said second diffusing means further comprises:

second suppressing means for performing suppression in such a manner that the value of the pixel of the isolated point will not be diffused from the isolated point in a case where the value of the pixel of the isolated point is "0"; and a look-up table (LUT), which corresponds to the magnification of the conversion of resolution, having position information for diffusing the value of the pixel of the isolated point.

15. The apparatus according to claim 11, wherein said third diffusing means further comprises:

third suppressing means for performing suppression in such a manner that the value of the pixel of the isolated point will not be diffused from the isolated point in a case where the value of the pixel of the isolated point is "0"; and a look-up table (LUT), which corresponds to the magnification of the conversion of resolution, having position information for diffusing the value of the pixel of the isolated point.

16. An image processing apparatus comprising:

input means for inputting binary image data;

resolution converting means for converting the resolution of the binary image data inputted by said input means in a manner such that the binary image data for one pixel becomes data for a plurality of pixels; and detecting means for detecting a pixel, which is an isolated point, in the binary image data inputted at said input means, wherein said detecting means further comprises:

search means for searching for binary image data peripheral to the pixel, with regard to each pixel of the inputted binary image data, in order to detect the isolated point; and feeding means for feeding the result of the search performed by said search means to said resolution converting means.

17. The apparatus according to claim 16, wherein said input means further comprises binarizing means for inputting multivalue image data, binarizing the multivalue image data and outputting the binarized image data.

18. The apparatus according to claim 16, wherein said search means further comprises:

narrow-area searching means which searches for peripheral pixels comparatively near the pixel; and wide-area searching means which searches for peripheral pixels comparatively far from the pixel.

19. The apparatus according to claim 18, wherein an area searched by said narrow-area searching means and said wide-area searching means is a rectangular area.

20. An image processing apparatus comprising:

input means for inputting binary image data;

resolution converting means for converting the resolution of the binary image data inputted by said input means in a manner such that the binary image data for one pixel becomes data for a plurality of pixels;

detecting means for detecting a pixel, which is an isolated point, in the binary image data inputted by said input means; and output means for outputting a light-and-dark image based upon an output obtained by said resolution converting means, wherein said resolution converting means diffuses the binary image data for the isolated pixel, detected by said detecting means, into a broader area than an area required for the plurality of pixels obtained at said resolution converting means, upon the resolution conversion.

21. The apparatus according to claim 20, wherein said input means further comprises binarizing means for inputting multivalue image data and binarizing the multivalue image data, wherein said binarizing means is such that the binarizing processing applied to the multivalue image data is executed using an error diffusion method.

22. An image processing apparatus comprising:

input means for inputting binary image data;

resolution converting means for converting the resolution of the binary image data input by said input means in a manner such that the binary image data for one pixel becomes data for a plurality of pixels;

detecting means for detecting a pixel, which is an isolated point, in the binary image data input by said input means, on the basis of the binary image data peripheral to the pixel; and effecting means for effecting the resolution converting by said resolution converting means, based on the result of the detection performed by said detecting means.

23. An image processing method comprising:

an input step of inputting binary image data;

a resolution converting step of converting the resolution of the binary image data input by said input step, in a manner such that the binary image data for one pixel becomes data for a plurality of pixels;

a detecting step of detecting a pixel, which is an isolated point, in the binary image data input by said input step, on the basis of the binary image data peripheral to the pixel; and an effecting step of effecting the resolution converting by said resolution converting step, based on the result of the detection performed in said detecting step.

* * * * *

UNITED STATES PATENT AND TRADEMARK OFFICE
CERTIFICATE OF CORRECTION

PATENT NO. : 5,502,495          Page 1 of 2
DATED     : March 26, 1996
INVENTOR(S) : Yuichi BANNAI, et al.

It is certified that error appears in the above-indentified patent and that said Letters Patent is hereby corrected as shown below:

COLUMN 1:

Line 62, "size" should read --size of--.

COLUMN 5:

Line 65, "signal to" should read --signals to--.

COLUMN 6:

Line 11, "a the" should read --a--; and,
    Line 50, ""+"terminals" should read
--"+" terminals--.

COLUMN 10:

Line 41, "the Signal" should read --the signal--.

COLUMN 11:

Line 31, "8 bit" should read --8-bit--.

UNITED STATES PATENT AND TRADEMARK OFFICE
CERTIFICATE OF CORRECTION

PATENT NO. : 5,502,495
DATED : March 26, 1996
INVENTOR(S) : Yuichi BANNAI, et al.

It is certified that error appears in the above-indentified patent and that said Letters Patent is hereby corrected as shown below:

COLUMN 13:

Line 46, "4" should read --4---; and
    Line 47, "bits, a 4 bits and a 16 bits" should read --bit, 4-bit and 16-bit--.

COLUMN 17:

Line 42, "differs part." should read --differs in part.--; and
    Line 52, "5 bits" should read --5-bits--.

COLUMN 23:

Line 51, "a error" should read --an error--.

Signed and Sealed this

Tenth Day of June, 1997

Attest:

BRUCE LEHMAN

Attesting Officer     Commissioner of Patents and Trademarks